(12) United States Patent
Krishnaswamy et al.

(10) Patent No.: US 8,593,421 B2
(45) Date of Patent: Nov. 26, 2013

(54) LOCAL COORDINATE FRAME USER INTERFACE FOR MULTITOUCH-ENABLED DEVICES

(75) Inventors: Aravind Krishnaswamy, San Jose, CA (US); Daniel K. Marcolina, Oreland, PA (US)

(73) Assignee: Adobe Systems Incorporated, San Jose, CA (US)

( * ) Notice: Subject to any disclaimer, the term of this patent is extended or adjusted under 35 U.S.C. 154(b) by 128 days.

(21) Appl. No.: 13/069,196

(22) Filed: Mar. 22, 2011

(65) Prior Publication Data
US 2012/0242586 A1 Sep. 27, 2012

(51) Int. Cl.
*G06F 3/041* (2006.01)

(52) U.S. Cl.
USPC .......................................... 345/173; 715/810

(58) Field of Classification Search
USPC ......... 345/173–178; 178/18.01–18.09, 18.11; 715/810–845
See application file for complete search history.

(56) References Cited

U.S. PATENT DOCUMENTS

| | | | |
|---|---|---|---|
| 5,825,352 A * | 10/1998 | Bisset et al. .................. | 345/173 |
| 6,323,846 B1 | 11/2001 | Westerman et al. | |
| 7,015,894 B2 | 3/2006 | Morohoshi | |
| 7,697,729 B2 | 4/2010 | Howell et al. | |
| 2005/0122313 A1* | 6/2005 | Ashby ............................ | 345/168 |
| 2005/0225538 A1* | 10/2005 | Verhaegh ........................ | 345/173 |
| 2006/0097991 A1 | 5/2006 | Hotelling et al. | |
| 2007/0139395 A1 | 6/2007 | Westerman et al. | |
| 2008/0163131 A1 | 7/2008 | Hirai et al. | |
| 2008/0180404 A1 | 7/2008 | Han et al. | |
| 2008/0284925 A1 | 11/2008 | Han | |
| 2009/0009491 A1 | 1/2009 | Grivna | |
| 2009/0085881 A1 | 4/2009 | Keam | |
| 2009/0183098 A1 | 7/2009 | Casparian et al. | |
| 2009/0309848 A1* | 12/2009 | Terada et al. .................. | 345/173 |
| 2010/0026667 A1 | 2/2010 | Bernstein | |
| 2010/0079413 A1 | 4/2010 | Kawashima et al. | |
| 2010/0117961 A1 | 5/2010 | Westerman | |

(Continued)

FOREIGN PATENT DOCUMENTS

| | | |
|---|---|---|
| EP | 2 169 528 | 3/2010 |
| FR | 2 120 131 | 11/2009 |
| FR | 2 936 326 | 3/2010 |
| WO | 2010/032223 | 3/2010 |

OTHER PUBLICATIONS

U.S. Appl. No. 13/069,197, filed Mar. 22, 2011, Aravind Krishnaswamy.
U.S. Appl. No. 13/069,199, filed Mar. 22, 2011, Aravind Krishnaswamy.
European Search Report from Application No. 12160298.1-2224, dated Jul. 23, 2012, Adobe Systems Incorporated, pp. 1-6.
Final Office Action, U.S. Appl. No. 13/069,197, (Mar. 4, 2013), 18 pages.
Non-Final Office Action, U.S. Appl. No. 13/069,197, (Oct. 12, 2012), 16 pages.
Notice of Allowance, U.S. Appl. No. 13/069,197, (May 24, 2013), 7 pages.
U.S. Appl. No. 13/069,196, filed Mar. 22, 2011, 59 pages.

*Primary Examiner* — Stephen Sherman
(74) *Attorney, Agent, or Firm* — Wolfe-SBMC

(57) ABSTRACT

Methods and apparatus for providing a local coordinate frame user interface for multitouch-enabled devices. A user interface may be provided on multitouch display devices, displayed according to a local coordinate frame constructed around the human hand. A user may place the tips of all five digits on a multitouch user interface with a natural gesture to provide five input points; the method detects which input points correspond to which digits, and constructs a local coordinate frame for the hand based on the input points. User interface elements (e.g., controls) may then be assigned to each digit and displayed on the multitouch display. The user may then selectively manipulate one or more of the displayed controls as desired via one or more gestures associated with the particular control.

21 Claims, 19 Drawing Sheets

(56) References Cited

U.S. PATENT DOCUMENTS

| | | |
|---|---|---|
| 2010/0127995 A1 | 5/2010 | Rigazio et al. |
| 2010/0328227 A1 | 12/2010 | Matejka et al. |
| 2011/0102333 A1 | 5/2011 | Westerman |
| 2012/0154313 A1* | 6/2012 | Au et al. ............ 345/173 |
| 2012/0235912 A1 | 9/2012 | Laubach |
| 2012/0242581 A1 | 9/2012 | Laubach et al. |
| 2012/0293442 A1 | 11/2012 | Westerman et al. |
| 2013/0127733 A1 | 5/2013 | Krishnaswamy |
| 2013/0132903 A1 | 5/2013 | Krishnaswamy |

* cited by examiner

| Touch point | Euclidian distance to: | | | | | Mean |
|---|---|---|---|---|---|---|
| | 1 | 2 | 3 | 4 | 5 | |
| 1 $(x_1,y_1)$ | - | d(1,2) | d(1,3) | d(1,4) | d(1,5) | M(1) |
| 2 $(x_2,y_2)$ | d(2,1) | - | d(2,3) | d(2,4) | d(2,5) | M(2) |
| 3 $(x_3,y_3)$ | d(3,1) | d(3,2) | - | d(3,4) | d(3,5) | M(3) |
| 4 $(x_4,y_4)$ | d(4,1) | d(4,2) | d(4,3) | - | d(4,5) | M(4) |
| 5 $(x_5,y_5)$ | d(5,1) | d(5,2) | d(5,3) | d(5,4) | - | M(5) |

LOCAL COORDINATE FRAME USER INTERFACE FOR MULTITOUCH-ENABLED DEVICES

BACKGROUND

Description of the Related Art

Gestures are commonly used in multitouch-enabled devices for invoking actions as a substitute for traditional user interface (UI) elements such as buttons and sliders. For example a swipe gesture (putting the finger down in one place and swiping across the device) can be used in place of a button to perform some action (e.g., turning a page). Another example might be putting two fingers down simultaneously and using the distance between the two fingers to apply a zoom (more commonly known as a 'pinch' gesture). These gestures, along with other conventional gestures, have certain things in common. For example, conventionally, gestures are agnostic to which finger or fingers was used to perform the gesture. Moreover, the multitouch-enabled devices themselves are agnostic as to which finger or fingers are used for a gesture, and have no way of detecting which finger or fingers is used. These devices are incapable of distinguishing the pressing of one finger from another. In addition, conventionally, gestures are usually used to perform a single action.

SUMMARY

Various embodiments of methods and apparatus for providing a local coordinate frame user interface for multitouch-enabled devices are described. Embodiments may provide a user interface, on multitouch display devices, displayed according to a local coordinate frame constructed around the human hand. In embodiments, a user may place the tips of all five digits (the four fingers, referred to herein as the index finger, middle finger, ring finger, and pinky finger, and the thumb) on a multitouch user interface with a natural gesture to provide five input points; the method detects which input points correspond to which digits, and constructs a local coordinate frame for the hand based on the input points. User interface elements (e.g., controls), which may be referred to as avatars, may then be assigned to each digit and displayed on the multitouch display. The user may then selectively manipulate one or more of the displayed controls as desired via one or more gestures associated with the particular control.

In a method of operation of a local coordinate frame user interface, a multi-digit touch gesture (e.g., a four-digit or five-digit touch gesture) may be detected on a multitouch-enabled device. The multitouch-enabled device may be any computing device that includes a multitouch gesture input mechanism. A local coordinate frame for the hand may be constructed from the detected multi-digit input. Two or more user interface elements (referred to as avatars), each avatar assigned to a particular one of the digits, and each representing an action or adjustment related to the application in which the interface is implemented, are displayed. An event selecting a particular one of the displayed user interface elements may be detected. An event that selects a particular avatar associated with a particular digit may, for example, be the lifting of the other digits. For example, to select an avatar associated with the thumb, the user may lift all digits except the thumb. In at least some embodiments, the displayed avatars may persist when the user lifts all digits from the multitouch-enabled device. The user may then select a particular avatar by touching the screen proximate to or on the desired avatar. The user may then apply one or more actions or adjustments according to touch or multitouch gestures relative to the selected user interface element (avatar).

Figure 1:
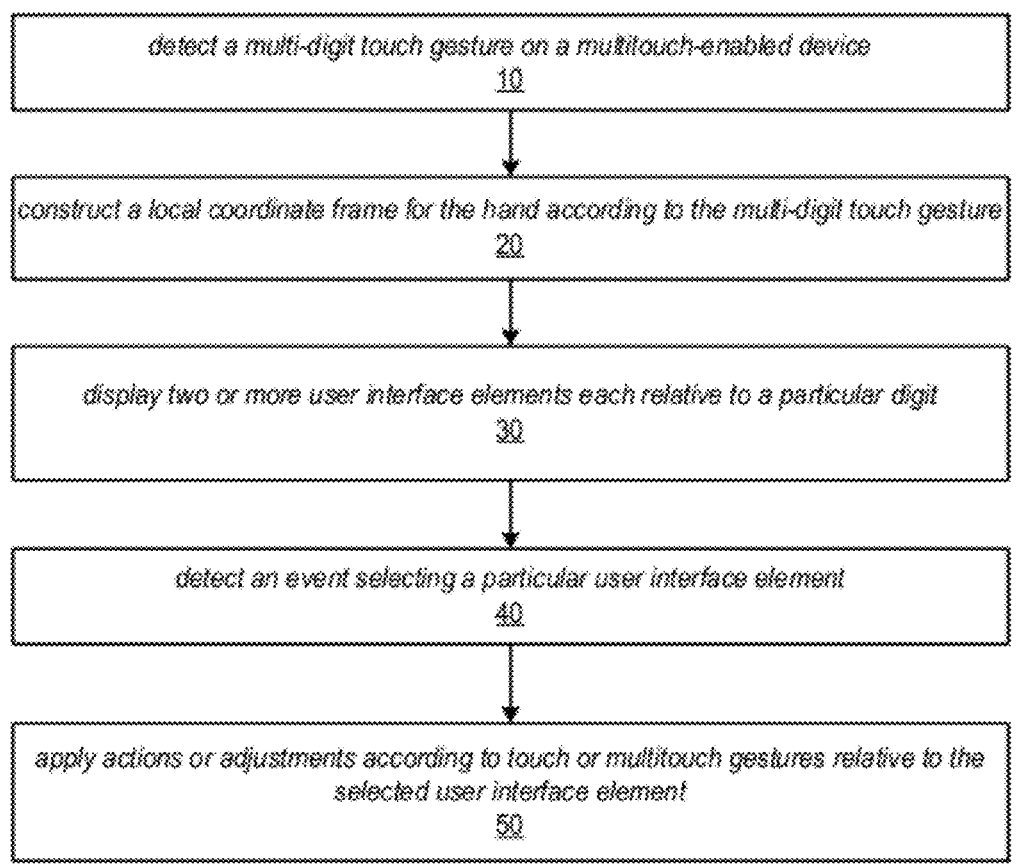
FIG. 1 is a high-level flowchart of a method of operation of a local coordinate frame user interface, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm as described herein, is generally considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods and apparatus for providing a local coordinate frame user interface for multitouch-enabled devices are described. Embodiments may provide a user interface, on multitouch display devices, displayed according to a local coordinate frame constructed around the human hand. In embodiments, a user may place the tips of all five digits (the four fingers, referred to herein as the index finger, middle finger, ring finger, and pinky finger, and the thumb) on a multitouch user interface with a natural gesture to provide five input points; the method detects which input points correspond to which digits, and constructs a local coordinate frame for the hand based on the input points. User interface elements (e.g., controls), which may be referred to as avatars, may then be assigned to each digit and displayed on the multitouch display. The user may then selectively manipulate one or more of the displayed controls as desired via one or more gestures associated with the particular control.

A heuristic technique is described that may be used in embodiments to compute the local coordinate frame from the five input points. The five input points may be received in no particular order relative to the digits; there is no implicit assumption as to the order or the values of the input points to the heuristic technique. A local coordinate frame may be computed relative to the entire hand and/or relative to each individual digit. The heuristic technique may be agnostic in regard to the orientation of the device and in regard to which hand (left or right) is used. Thus, the user may use either the left or the right hand to invoke the local coordinate frame user interface, and may do so at different orientations relative to the device itself. In addition, the technique may substantially continuously detect motion of the digits on the multitouch device and update the local coordinate frame relative to the device in response to the motion; thus, the user may move or rotate their hand, and the displayed user interface updates accordingly to adjust to the new positioning of the hand relative to the device. In addition, the heuristic technique may infer a relative position of the palm of the hand from the digit input points, allowing the user interface to display various user interface elements where the elements are likely to be visible, rather than occluded by the user's hand, or to conversely purposefully display a user interface element where the element will be occluded by the palm until the user removes their hand.

Embodiments may detect an event that selects one of the displayed avatars associated with a particular digit. An event that selects a particular avatar associated with a particular digit may, for example, be the lifting of the other four digits. For example, to select an avatar associated with the index finger, the user may lift all of the other fingers and the thumb. In at least some embodiments, the displayed avatars may persist when the user lifts all five digits from the multitouch-enabled device; the user may then select a particular avatar by touching the screen proximate to or on the avatar.

Example use cases for the local coordinate frame user interface in applications for multitouch devices are described.

The use cases include examples in which the local coordinate frame user interface may be used in combination with other input, for example stylus input, in applications for multitouch devices.

Embodiments of the local coordinate frame user interface may be implemented in any application that supports multitouch input on multitouch-enabled devices to display one or more user interface elements respective to particular digits. An example category of application in which embodiments may be implemented are digital photograph adjustment, artistic, graphical design, and image processing applications, or more generally in applications in which the user may interact with a multitouch-enabled device via a multitouch-enabled application for artistic or other purposes. Embodiments of the local coordinate frame user interface may, for example, be implemented as a module of an application, as a plug-in for applications including but not limited to artistic, graphical design, and image processing applications, and/or as a library function or functions that may be called by other applications including, but not limited to, artistic, graphical design, and image processing applications. Specific examples of applications or technologies in which embodiments may be implemented include, but are not limited to, Adobe® Photoshop® technology, Adobe® Flash® technology, Adobe® Illustrator® technology, and Adobe® After Effects® technology. "Adobe", "Photoshop", "Flash", "Illustrator", and "After Effects" are either registered trademarks or trademarks of Adobe Systems Incorporated in the United States and/or other countries.

An example artistic application in which embodiments of the local coordinate frame user interface may be implemented is described in U.S. patent application Ser. No. 13/029,036, titled "Methods and Apparatus for Simulation Of Fluid Motion Using Procedural Shape Growth," which is incorporated by reference herein in its entirety.

Figure 10:
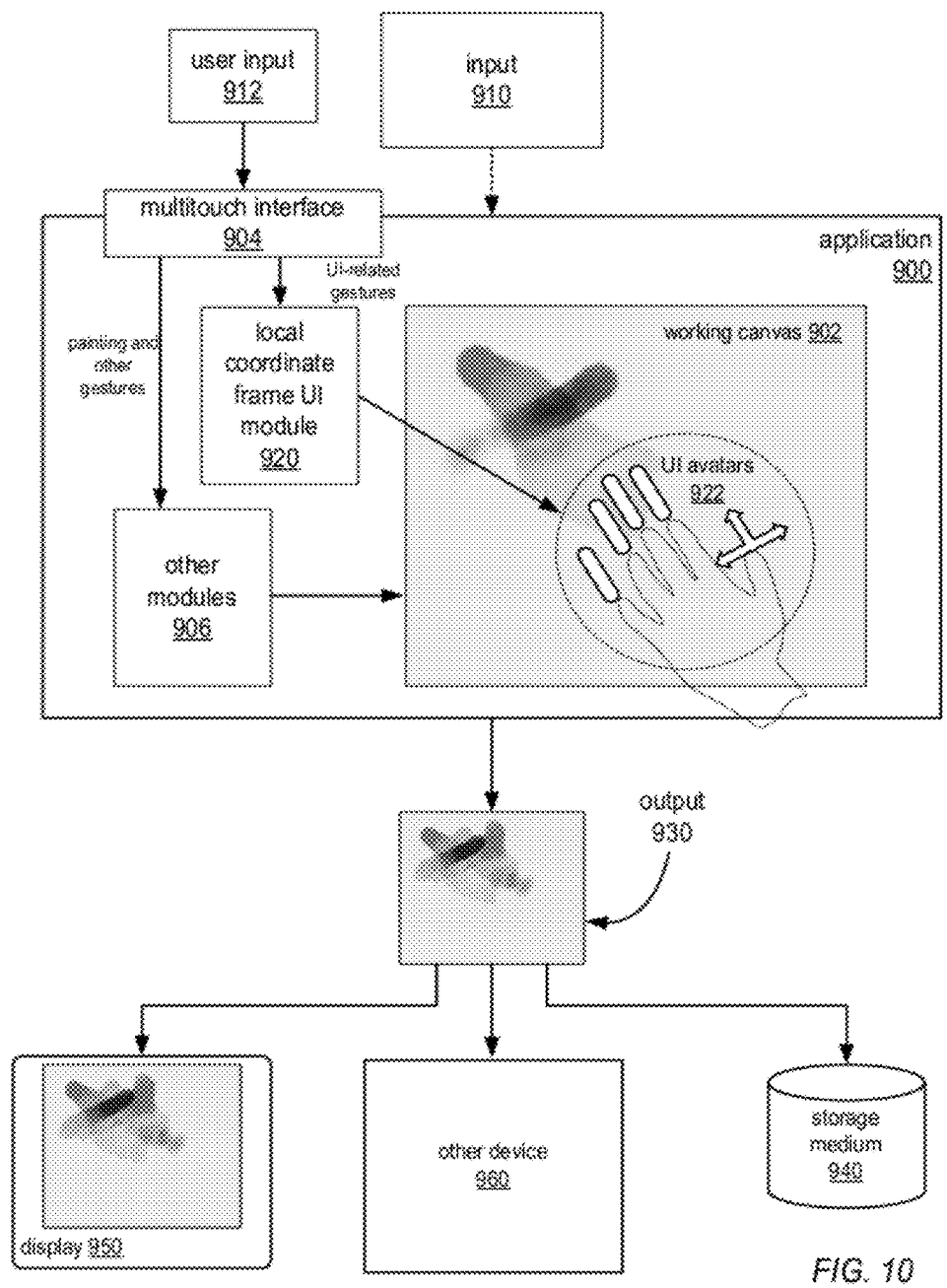
FIG. 10 illustrates a local coordinate frame user interface (UI) module that implements a local coordinate frame user interface technique as described in FIGS. 1 through 9 in an example artistic application.
Figure 12:
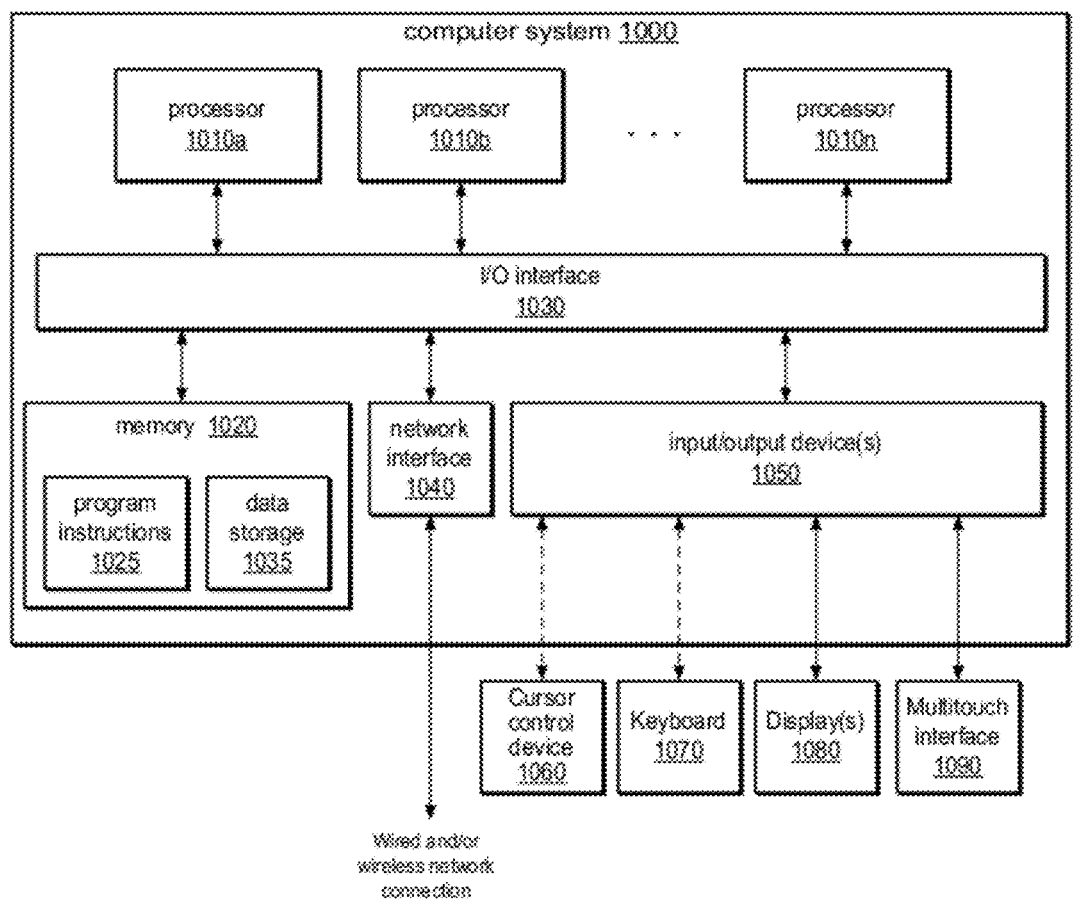
FIG. 12 illustrates an example computer system that may be used in embodiments.

Embodiments of the local coordinate frame user interface and the actions or adjustments enabled by the digit-specific avatars provided via the user interface may be implemented and performed by a module or modules implemented by program instructions stored in a computer-readable storage medium and executable by one or more processors (e.g., one or more CPUs and/or GPUs). In some embodiments, at least some components of the local coordinate frame user interface and the actions or adjustments enabled by the digit-specific avatars provided via the user interface may be implemented on or in one or more graphics processing units (GPUs). An example module that may implement embodiments, and an example application that may implement the module, as described herein is illustrated in FIG. 10. An example computer system on which embodiments may be implemented is illustrated in FIG. 12.

While embodiments of the local coordinate frame user interface are generally described as being invoked in response to a five-digit gesture, in at least some embodiments, the interface may be invoked using other gesture inputs, for example with a four-digit gesture or with a swipe across the multitouch-enabled device. These other gesture inputs may, for example, allow users that lack dexterity in a hand or that are missing one or more digits on a hand to invoke the interface.

High-Level Operations of the Local Coordinate Frame User Interface

FIG. 1 is a high-level flowchart of a method of operation of a local coordinate frame user interface, according to at least some embodiments. As indicated at 10, a multi-digit touch gesture (e.g., a four-digit or five-digit touch gesture) may be detected on a multitouch-enabled device. The multitouch-enabled device may, for example, be a desktop computer, a notebook or laptop computer, a portable multitouch-enabled device such as an Apple® iPad® or similar devices, or in general any computing device that may provide a multitouch-enabled input mechanism. As indicated at 20, a local coordinate frame for the hand may be constructed from the detected multi-digit input. As indicated at 30, two or more user interface elements (referred to as avatars), each avatar assigned to a particular one of the digits, and each representing an action or adjustment related to the application in which the interface is implemented, are displayed. As indicated at 40, an event selecting a particular one of the displayed user interface elements may be detected. An event that selects a particular avatar associated with a particular digit may, for example, be the lifting of the other digits. For example, to select an avatar associated with the thumb, the user may lift all digits except the thumb. In at least some embodiments, the displayed avatars may persist when the user lifts all of the digits from the multitouch-enabled device. The user may then select a particular avatar by touching the screen proximate to or on the desired avatar. As indicated at 50, the user may then apply one or more actions or adjustments according to touch or multitouch gestures relative to the selected user interface element (avatar).

Constructing Local Coordinate Frames

Figures 2A, 2B:
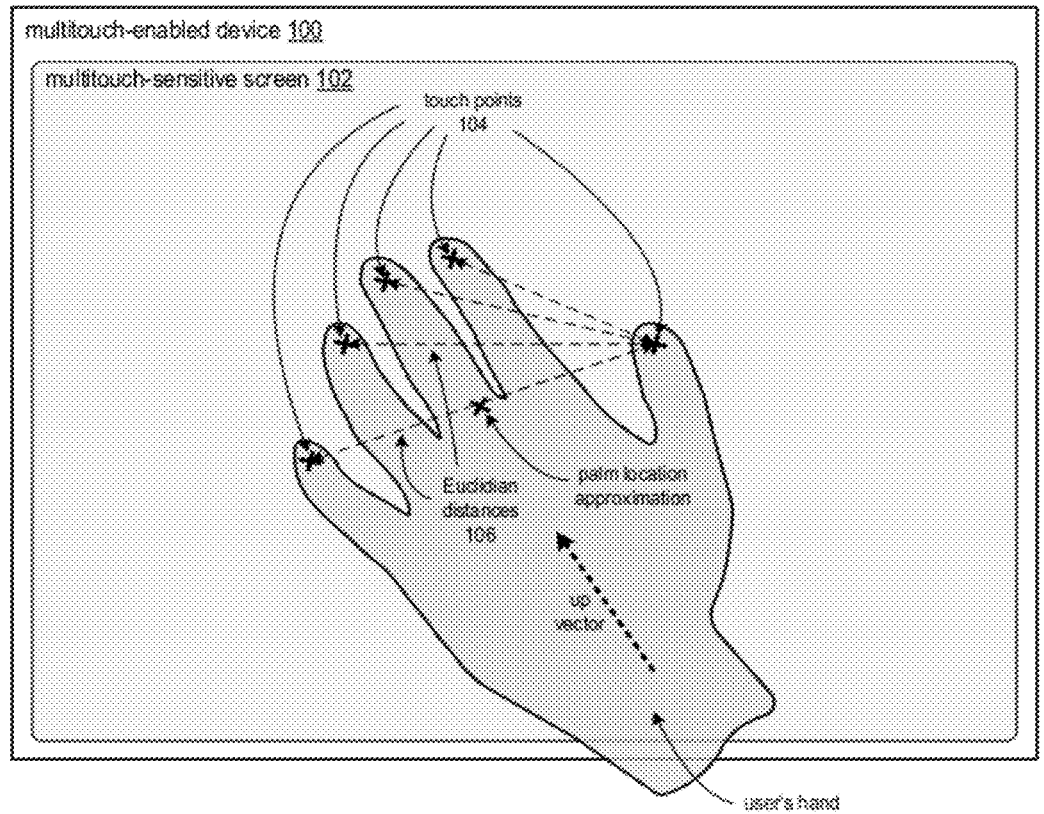
FIG. 2A is a graphical representation of a multitouch-enabled device, and illustrates a heuristic technique for constructing a local coordinate frame for a hand used to apply a five-digit touch gesture to invoke the local coordinate frame user interface, according to at least some embodiments.
FIG. 2B shows an example array or table of values that may be used in the heuristic technique as illustrated in FIGS. 2A and 3, according to at least some embodiments.
Figure 3:
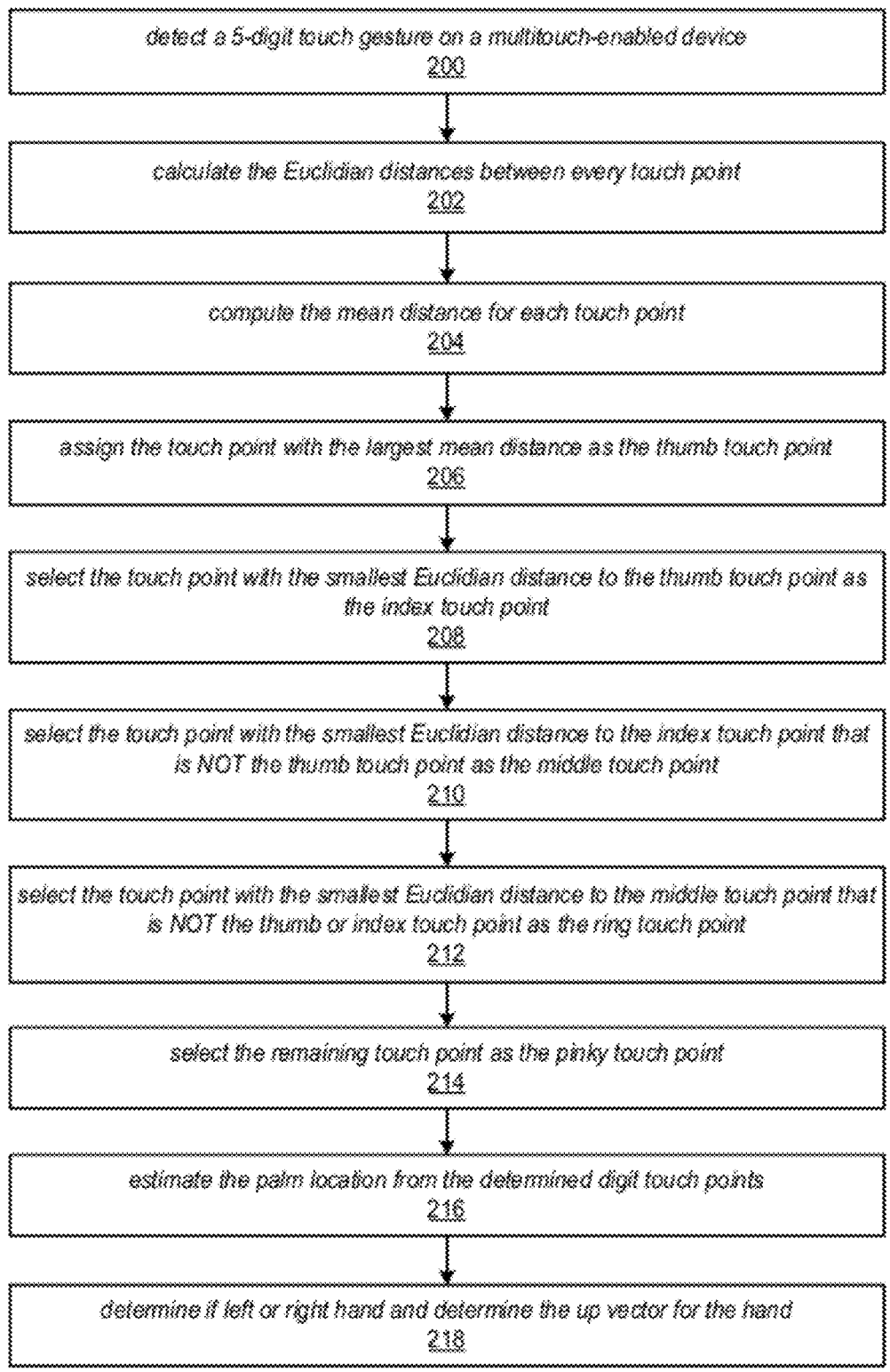
FIG. 3 is a flowchart of a heuristic technique for constructing the local coordinate frame, according to at least some embodiments.

FIGS. 2A-2B and 3 illustrate a heuristic technique for constructing a local coordinate frame, according to at least some embodiments. FIG. 3 is a flowchart of a heuristic technique for constructing the local coordinate frame, according to at least some embodiments. As indicated at 200, the method may detect a five-digit touch gesture on a multitouch-enabled device. FIG. 2A is a graphical representation of a multitouch-enabled device 100 including a multitouch-sensitive screen 102. As shown, a user may apply a five-digit, natural gesture to the multitouch-sensitive screen 102. A local coordinate frame user interface module (not shown) implemented on the device 100 may detect, or receive an indication of, the five-digit touch gesture. The local coordinate frame user interface module may determine or obtain five touch points 104 corresponding to the five-digit gesture input. The five touch points 104 may be represented as Cartesian coordinates ((x, y) coordinates, as shown in the first column of FIG. 2B) relative to some point on the screen 102, typically relative to one of the corners of the screen 102.

As indicated at 202 of FIG. 3, the Euclidian distance between every touch point may be calculated using the Cartesian coordinates of the touch points. Referring to FIG. 2A, the local coordinate frame user interface module may determine the Euclidian distances 106 between every touch point 104, and may construct a table or array recording the five touch points and the Euclidian distance 106 from each of the touch points 104 to each other touch point 104. An example of such a table or array is shown in FIG. 2B. In FIG. 2B, the "d(a,b)" entries represent values for the Euclidian distances 106 to other touch points 104; the "-" entries represent that the distance from a touch point to itself is null or zero. Note that, at this point, the five touch points 104 (1 through 5) are not yet associated with any particular digit.

As indicated at 204 of FIG. 3, the method may compute the mean distance for each touch point in the array. For example, the mean distance for touch point 1 would be the sum of the distances from touch point 1 to each of touch points 2 through 5, divided by 4. In FIG. 2B, the computed means are shown as the "M(a)" entries.

As indicated at 206, the method may assign the touch point with the largest mean distance as the thumb touch point. For most users, the mean distance from the thumb to the other four digits will be greater than the mean distance from any other digit to the other four digits, assuming a natural, relaxed touch gesture as illustrated in FIG. 2A.

After assigning the thumb touch point, the heuristic method may then assign touch points to each of the four fingers. As indicated at 208, the method may then select the touch point with the smallest Euclidian distance to the touch point assigned to the thumb as the index finger (or simply index) touch point. As indicated at 210, the method may then select the touch point with the smallest Euclidian distance to the index touch point (that is not the thumb touch point) as the middle finger (or simply middle) touch point. As indicated at 212, the method may then select the touch point with the smallest Euclidian distance to the middle touch point (that is not the thumb or index touch point) as the ring finger (or simply ring) touch point. As indicated at 214, the method may then select the remaining touch point as the pinky finger (or simply pinky) touch point.

As indicated at 216, the method may estimate the palm location from the determined digit touch points. In at least some embodiments, to determine the palm location, the method may take the midpoint between the pinky touch point and the thumb touch point as an approximation of the palm location, as shown in FIG. 2A. For most users, this will be a good approximation of the location of the palm, assuming a natural gesture as shown in FIG. 2A. Other methods, however, may be used to determine the palm location from the determined digit touch points. For example, in some embodiments, the location of the palm may be determined by calculating a centroid of all five touch points.

As indicated at 218, the method may determine whether the five-digit touch gesture was performed using the left or the right hand, and the "up" direction or up vector, as shown in FIG. 2A, for the hand. In at least some embodiments, this determination may be made by taking unit vectors from two digits to another digit and using the directions of these vectors to determine the up direction. For example, in some embodiments, the method may take a unit vector from the index touch point to the thumb touch point, and a unit vector from the middle touch point to the thumb touch point, and use the directions in which those vectors point to infer an up direction or vector.

Using the middle finger as an example, the method may take a vector between the middle touch point and index touch point, and the vector between the ring touch point and the middle touch point, compute orthogonals of the vectors, and take the average of the orthogonals as the up vector. This method provides a good approximation of what the up direction is for the middle finger, which may then be used as the up vector for the hand as a whole.

Note, however, that coordinate systems for display devices are relative to an origin at some position on the display. For most such devices, the origin is at the upper left hand corner. Because of this, the determined up vector may be negative for one hand, and positive for the other hand. To adjust for this, the vector may be reversed in the negative case. In at least some embodiments, to perform this adjustment, the method may determine the up vector for a digit (e.g., for the middle or index finger) and take the dot product of that vector and a vector from the thumb to another digit (e.g., the ring finger). If the dot product of those two vectors is negative, the up vector is reversed or flipped. Using this technique, the up vectors for all digits may point in the correct up direction, whether the hand is the left or right hand.

FIG. 3 describes a heuristic method for determining a local coordinate frame for the hand that performs the five-digit touch gesture. The method is agnostic as to which hand is used, determining which touch points corresponds to which digits regardless of whether the input is provided using the left hand or the right hand. In addition, the method is agnostic in regard to the orientation of the hand relative to the multi-touch-enabled device 100. Note, however, that other methods or techniques may be employed to map the five input touch points to particular digits and to perform the other tasks in determining the local coordinate frame in some embodiments.

The Cartesian coordinates of the five touch points, the particular digit assigned to each touch point, the estimated location of the palm, the left or right hand determination, and the determined up vector collectively provide the local coordinate frame for the hand that performs the five-digit touch gesture. Once the method determines the local coordinate frame, the local coordinate frame may be updated by tracking the locations of the five digits on the display screen 102, without having to remap the touch points to particular digits, determine the palm location, up direction, and so on.

Displaying the Local Coordinate Frame User Interface

Figure 4A:
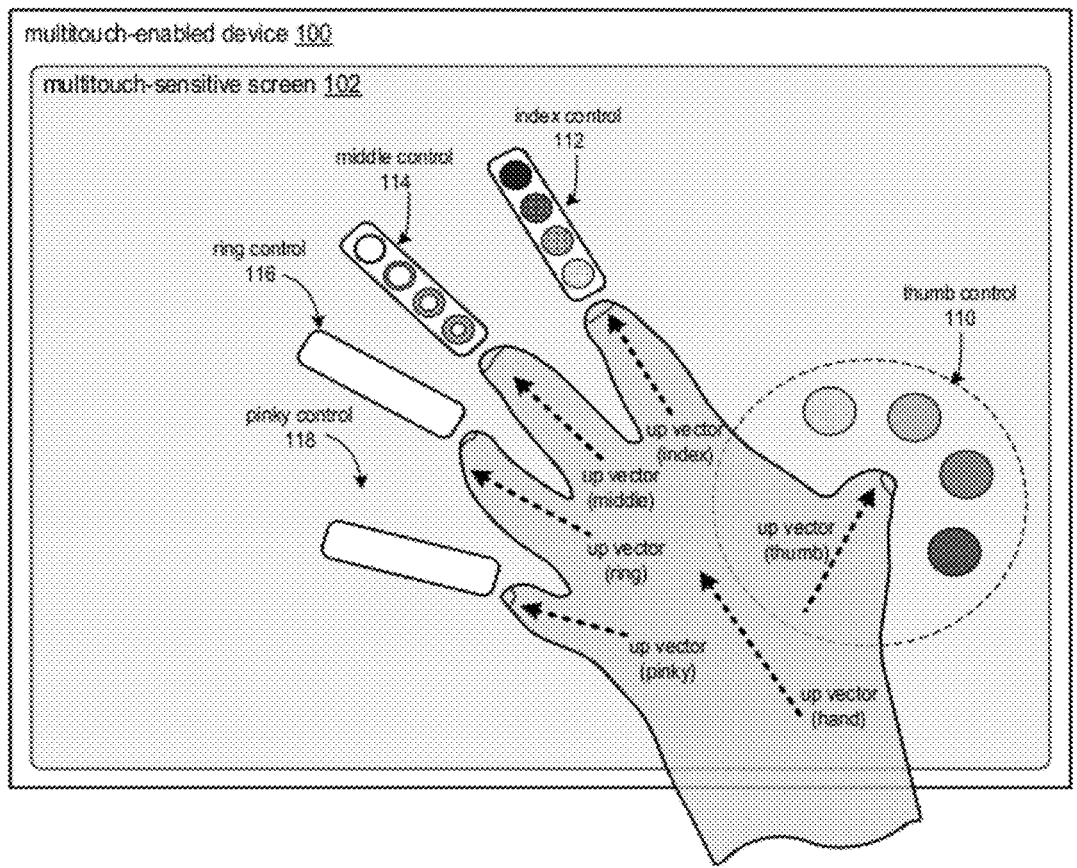
FIG. 4A illustrates an example local coordinate frame user interface in which a separate control or avatar is displayed relative to each of the five digits of a user's left hand that was used to perform a five-digit touch gesture, according to at least some embodiments.

After determining the local coordinate frame for the hand, for example using the method illustrated in FIG. 3, the local coordinate frame user interface module may display one or more user interface elements or avatars relative to the determined local coordinate frame. FIG. 4A illustrates an example in which a separate control or avatar is displayed relative to each of the five digits of a user's left hand that was used to perform the five-digit touch gesture. The example shows the user interface elements as a thumb control 110, index control 112, middle control 114, ring control 116, and pinky control 118. While FIG. 4A shows a user interface element or avatar displayed for each of the five digits, in some implementations a user interface element or avatar may be displayed for only some of the digits, for example for the thumb and index and middle fingers. In the example shown in FIG. 4A, for example, the thumb control 110 represents a color picker control for picking colors for tools or selected objects, the index control 112 represents an opacity control for adjusting the opacity of tools or selected objects, and the middle control 114 represents a size control for adjusting the size of tools or selected objects, while the ring control 116 and pinky control 118 are undefined. In at least some embodiments, the displayed controls may be inactive until an action is performed by the user to select a particular control.

To display a user interface element or control for each digit, the method may determine a local coordinate frame for that digit. In at least some embodiments, a local coordinate frame for a digit may be compactly represented in terms of a two-dimensional up vector. The dashed lines with arrows in FIG. 4A represent example up vectors for the five digits; also shown is an up vector representing the overall local coordinate frame for the hand. Similar but different techniques may be used to construct the local coordinate frame (up vector) for each individual digit. The following describes example techniques that may be used in at least some embodiments to compute the up vector corresponding to each digit.

To determine the up vector for the thumb, a technique may be used that takes the vector from the thumb touch point to the index touch point and computes a vector orthogonal to it. That vector is then used as the up vector for the thumb.

To determine the up vector for the index finger, a technique may be used that takes the vector from the index touch point to the thumb touch point and the vector from the index touch point to the middle touch point. These two vectors may be averaged, and the orthogonal of that average vector may be used as the up vector for the index finger.

To determine the up vector for the middle finger, a technique may be used that takes the vector from the middle touch point to the thumb touch point and the vector from the middle touch point to the ring touch point. These two vectors may be averaged, and the orthogonal of that average vector may be used as the up vector for the middle finger.

To determine the up vector for the ring finger, a technique may be used that takes the vector from the ring touch point to the pinky touch point and the vector from the ring touch point to the middle touch point. These two vectors may be averaged, and the orthogonal of that average vector may be used as the up vector for the ring finger.

For the pinky finger, the method may use the orthogonal of the vector from the pinky touch point to the ring touch point as the up vector.

The overall local coordinate frame for the hand may also be compactly represented as a two-dimensional up vector. In at least some embodiments, to compute the overall local coordinate frame for the hand, the technique may use the average of the up vectors for the index and middle fingers as the up vector for the hand.

Other techniques may be used to determine and/or represent the local coordinate frames for the digits and the overall local coordinate frame for the hand.

Figure 4B:
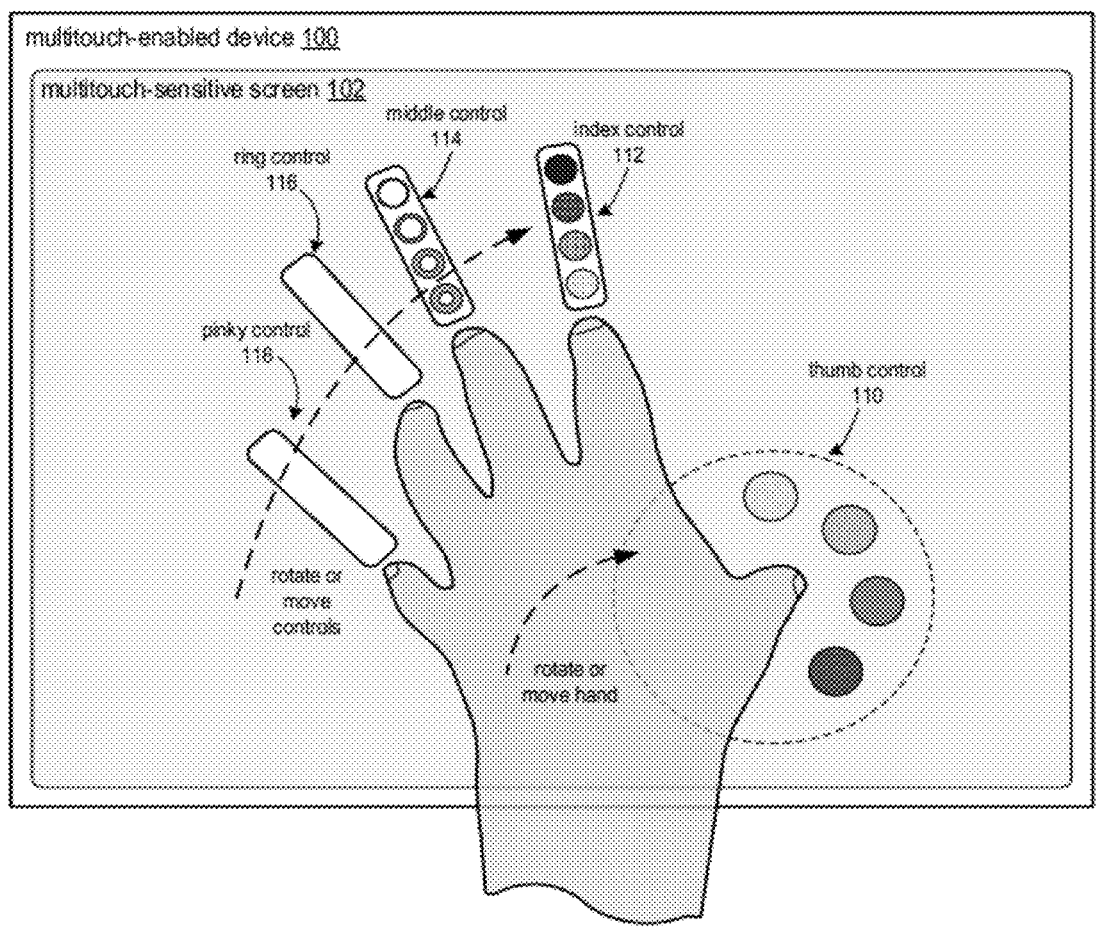
FIG. 4B illustrates that the user may move or rotate their hand, and that the displayed user interface elements are adjusted according to the updated locations of the touch points and the previously determined local coordinate frame for the hand.

In FIG. 4A, the user's five digits may be assumed to still be in contact with the multitouch-sensitive screen 102. However, in at least some embodiments, the user interface elements or elements relative to the local coordinate frame for the hand may continue to be displayed and updated as necessary as long as at least two digits remain in contact with the multitouch-sensitive screen 102. FIG. 4B illustrates that the user may move or rotate their hand, and that the displayed user interface elements are adjusted according to the updated locations of the touch points and the previously determined local coordinate frame for the hand. In at least some embodiments, as long as more than one digit remains in contact with the multitouch-sensitive screen 102, all of the controls corresponding to the digits, while being displayed and updated, may remain inactive so that motions of the user's hand do not result in application of the corresponding actions or adjustments.

Figure 4C:
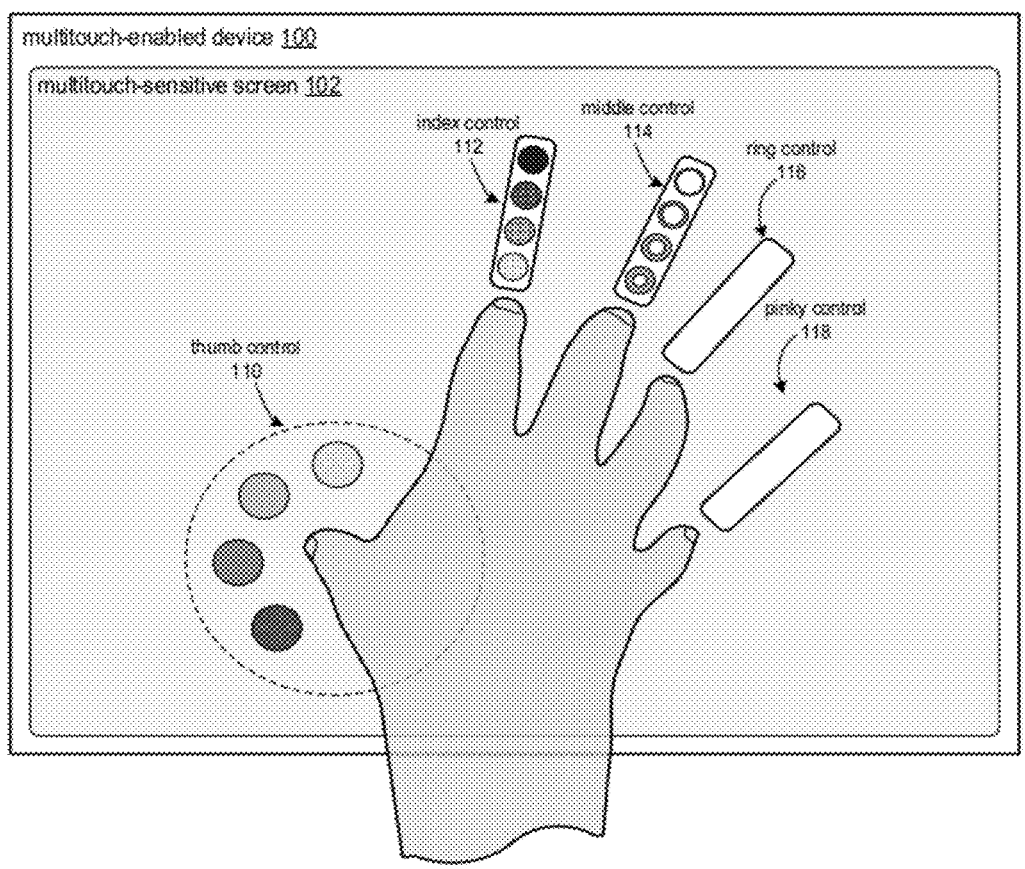
FIG. 4C illustrates using the right hand to perform the five-digit touch gesture, according to at least some embodiments.

While FIGS. 4A and 4B illustrate the left hand performing the five-digit multitouch gesture, FIG. 4C illustrates using the right hand to perform the gesture, according to at least some embodiments. In FIG. 4C, the local coordinate frame is correctly determined for the right hand, and the user interface elements or avatars are displayed corresponding to the correct digits. Thus, for example, the index control 112 for the left hand corresponds to the index control 112 for the right hand, in this example both being an opacity control.

Activating and Using Controls

Figure 5A:
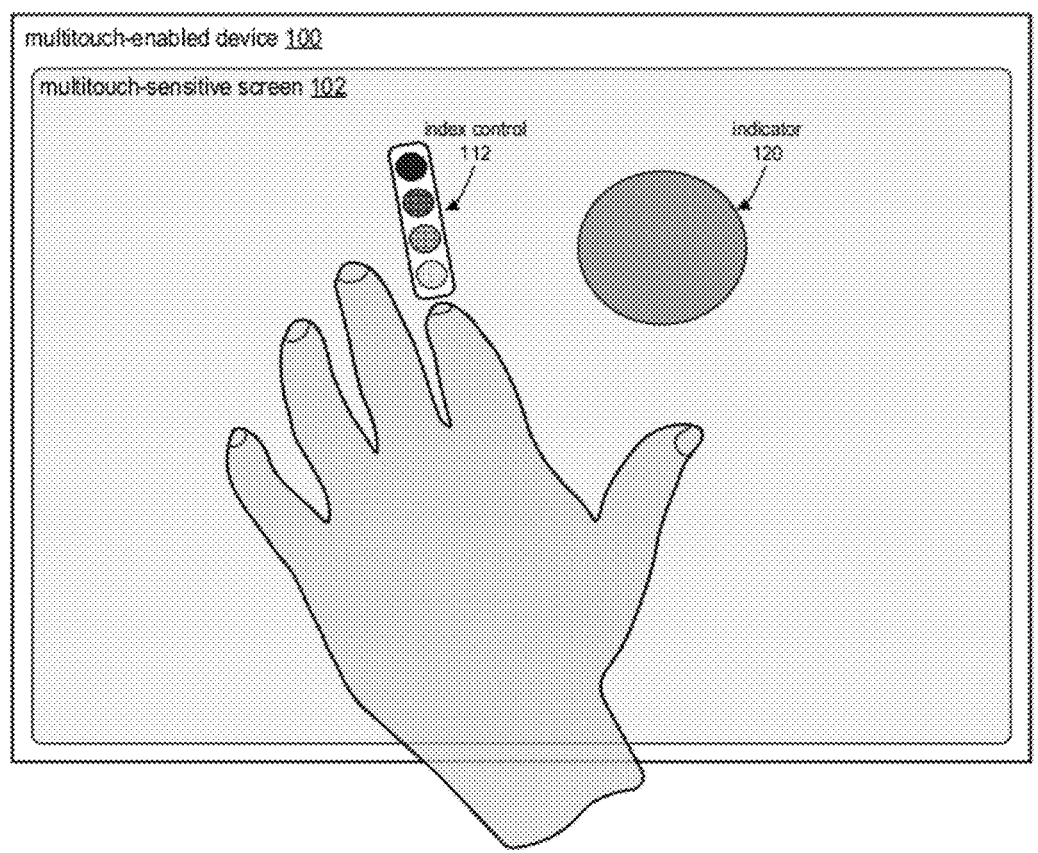
FIG. 5A graphically illustrates the user lifting all but one digit, in this example lifting all digits except for the index finger, according to at least some embodiments.

FIG. 5A graphically illustrates the user lifting all but one digit, in this example lifting all digits except for the index finger, according to at least some embodiments. Once the user lifts up four digits (leaving only one digit still in contact with the multitouch-sensitive screen 102), the method may compute or use a previously computed local coordinate frame for the remaining digit, and activate the corresponding user interface element or avatar according to that frame. The other user interface elements or avatars corresponding to the lifted digits may be removed and/or disabled. From that point on, any motions or gestures the user performs may be applied to a specific action or adjustment corresponding to the user interface element or avatar associated with that digit. In the example shown in FIG. 5A, the user has lifted all but the index finger, and thus the index control 112 (in this example, an opacity control) is displayed and activated.

Figure 5B:
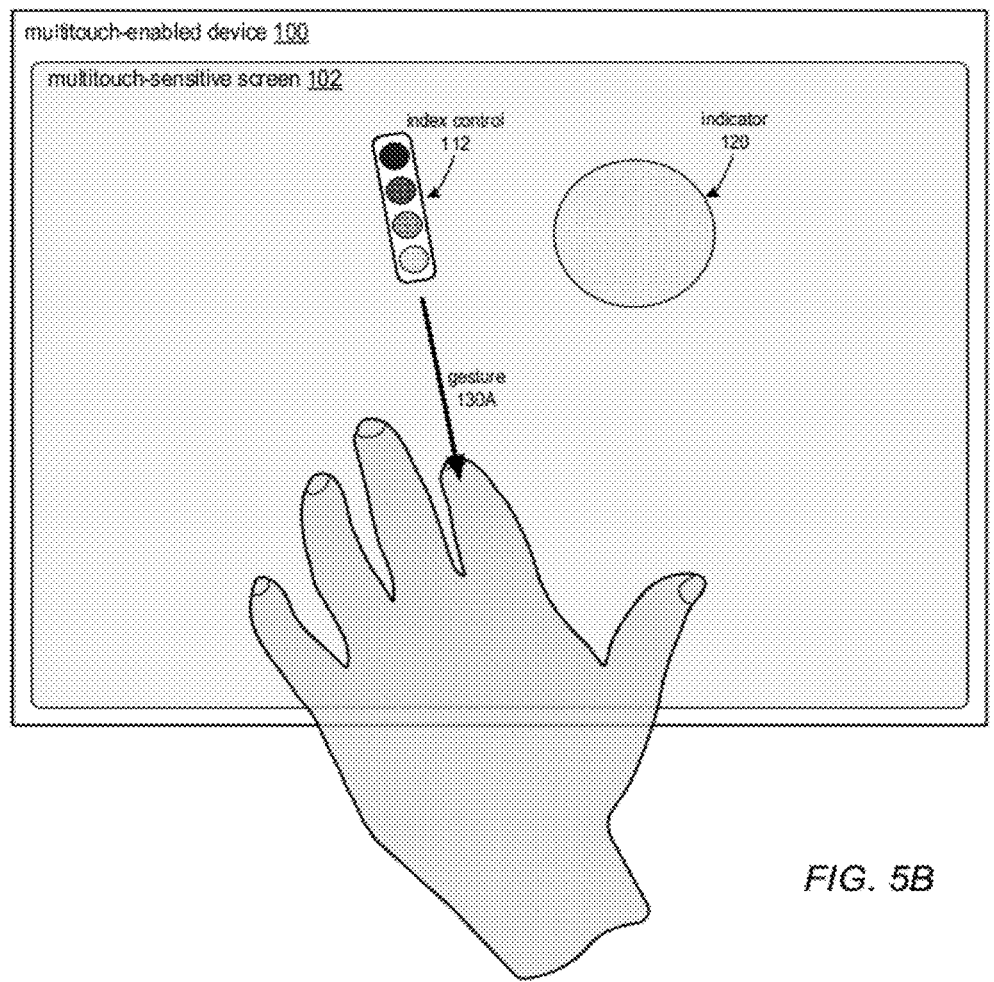
FIGS. 5B and 5C illustrate the manipulation of a control corresponding to a digit that was left in contact with the multitouch-sensitive screen when all the other digits are raised, according to at least some embodiments.
Figure 5C:
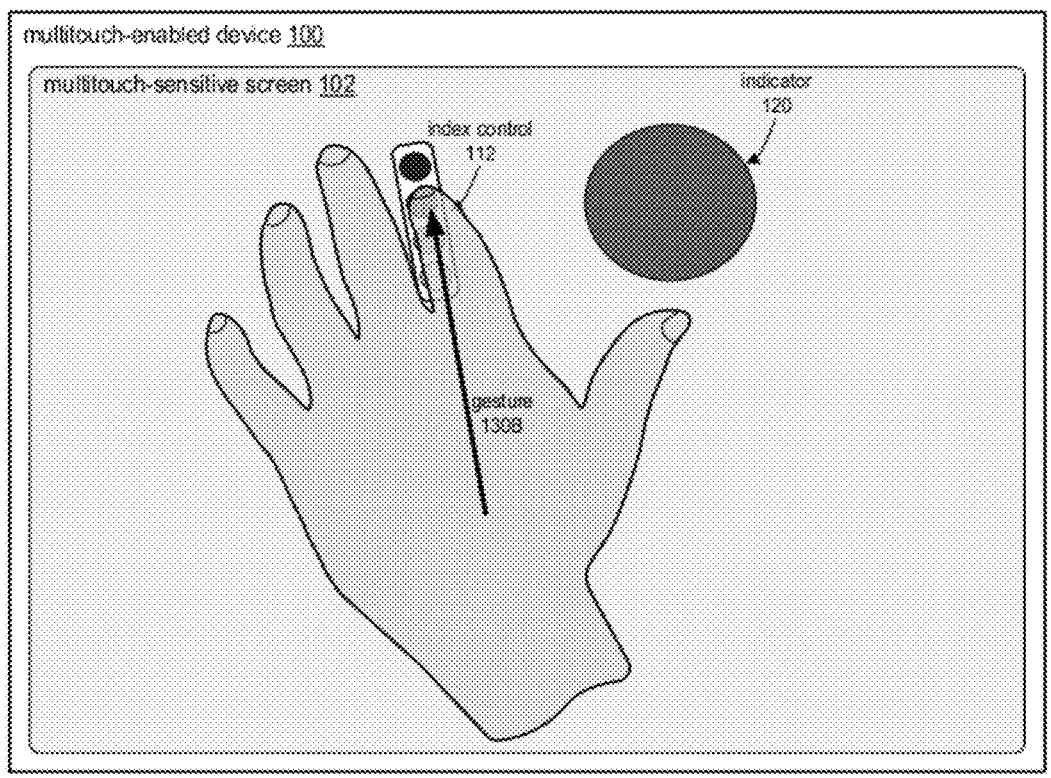

FIGS. 5B and 5C illustrate the manipulation of a control corresponding to a digit that was left in contact with the multitouch-sensitive screen 102 when all the other digits are raised, according to at least some embodiments. Using the local coordinate frames for the indexes, adjustments or actions may be performed using a digit in a way that is natural for the orientation of the respective digit. For example, as shown in FIG. 5B, by performing a gesture 130A in which the index finger is moved down relative to the local coordinate frame of the index finger, a parameter value associated with the index control 112 may be increased. As shown in FIG. 5C, by performing a gesture 130B in which the index finger is moved up relative to the local coordinate frame of the index finger, the parameter value associated with the index control 112 may be decreased. By having a distinct local coordinate frame for each digit, the movements respective to each digit may be performed in a way that is natural for the hand rather than in a way that depends on the orientation of the device.

As shown in FIGS. 5B and 5C, in at least some embodiments, for at least some controls, an indicator 120 may be displayed that provides relevant feedback to the user in response to gestures manipulating the currently active control. In the example shown in FIGS. 5B and 5C, the indicator 120 visually shows results of adjusting the opacity up and down using the index control 112. To display an indicator 120, the method may determine an area of the screen in which to display the indicator that is not likely to be occluded by the user's hand according to the local coordinate frame information for the hand that has previously been calculated and that may be adjusted as the user moves their hand.

Examples of Other Gestures and Controls

While FIGS. 5B and 5C illustrate the use of up and down gestures relative to a control (e.g., index control 112) to adjust a parameter value up or down corresponding to that control, other types of controls, and other gestures, may be supported in a local coordinate frame user interface to perform various actions or adjustments.

Figure 6:
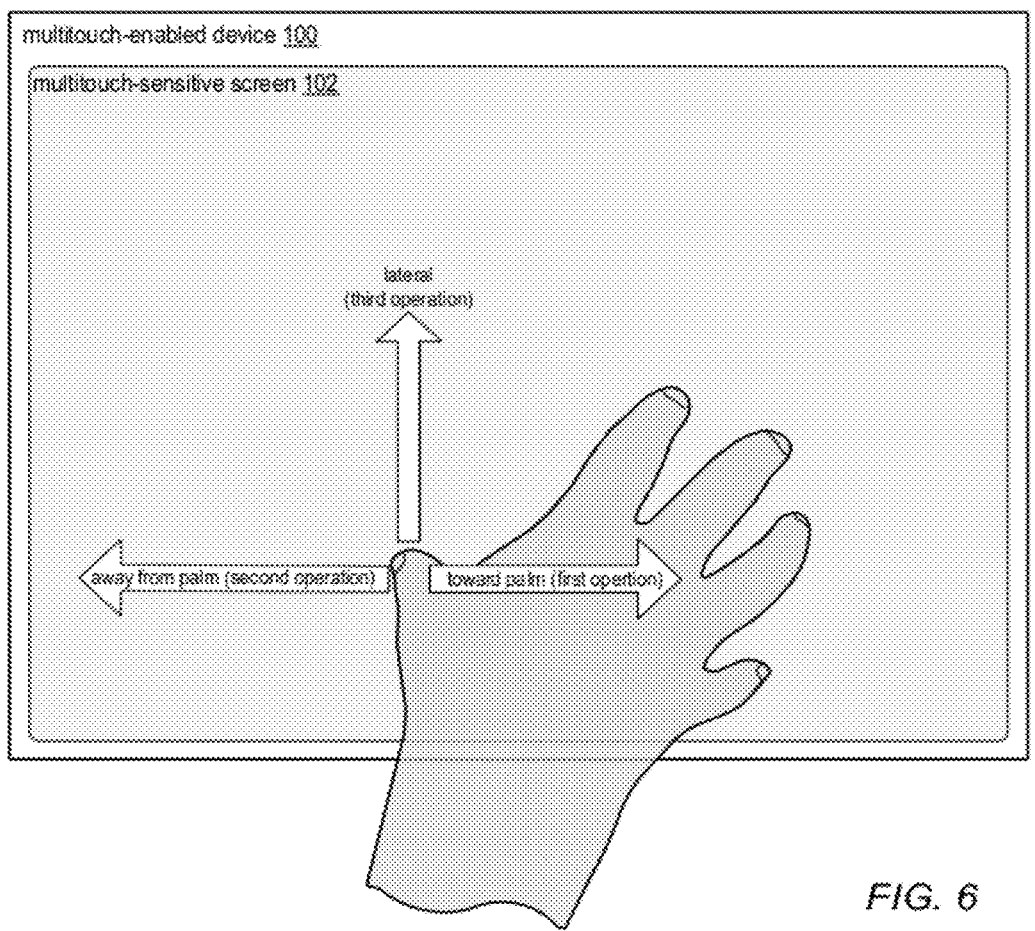
FIG. 6 illustrates an example in which the thumb may be used to perform various actions based on multiple distinct gestures that can be made with the thumb once the other four digits have been raised, according to at least some embodiments.

FIG. 6 illustrates an example in which the thumb may be used to perform various actions based on multiple distinct gestures that can be made with the thumb once the other four digits have been raised, according to at least some embodiments. In this example, a vector may be determined from the thumb touch point to the index touch point, or alternatively to the palm location or the touch point of some other digit. A swipe gesture with the thumb on the multitouch-sensitive screen 102 in that direction may initiate a first action (e.g., an undo operation). A swipe gesture in the opposite direction may initiate a second operation (e.g., a redo operation). A swipe perpendicular to that direction (orthogonal to the vector from the thumb touch point to the index touch point, or some other point) may initiate a third operation (e.g., a clear screen operation). While FIG. 6 shows this technique as being performed with the right hand, the same technique may be performed with the left hand, but with the orientation of the vector from the thumb touch point to the index touch point reversed.

As another example, the local coordinate frame user interface may display a user interface element, such as a color wheel, which may be displayed and activated when all but one, or all, digits are removed from the multitouch-sensitive screen. The user may then apply a selection gesture to the user interface element, such as touching the element and moving the finger in a circular or other motion, to select some value (e.g., a color) from the wheel. The current selection may be shown in an indicator 120 element. FIG. 8C shows an example of a color wheel user interface element.

As another example, the user may lift up all but one digit, for example all but the index finger. A tap of the multitouch-sensitive screen 102 with another digit, or some other action with one or more other digits such as a pinching action with two digits, may then be interpreted as a particular gesture to perform a particular action or adjustment.

The above are all given by way of example, and are not intended to be limiting. Embodiments may be adapted to display a wide variety of user interface controls, and to accept and interpret a wide variety of gestures to initiate actions corresponding to those controls.

Orientation of Controls

Figure 7:
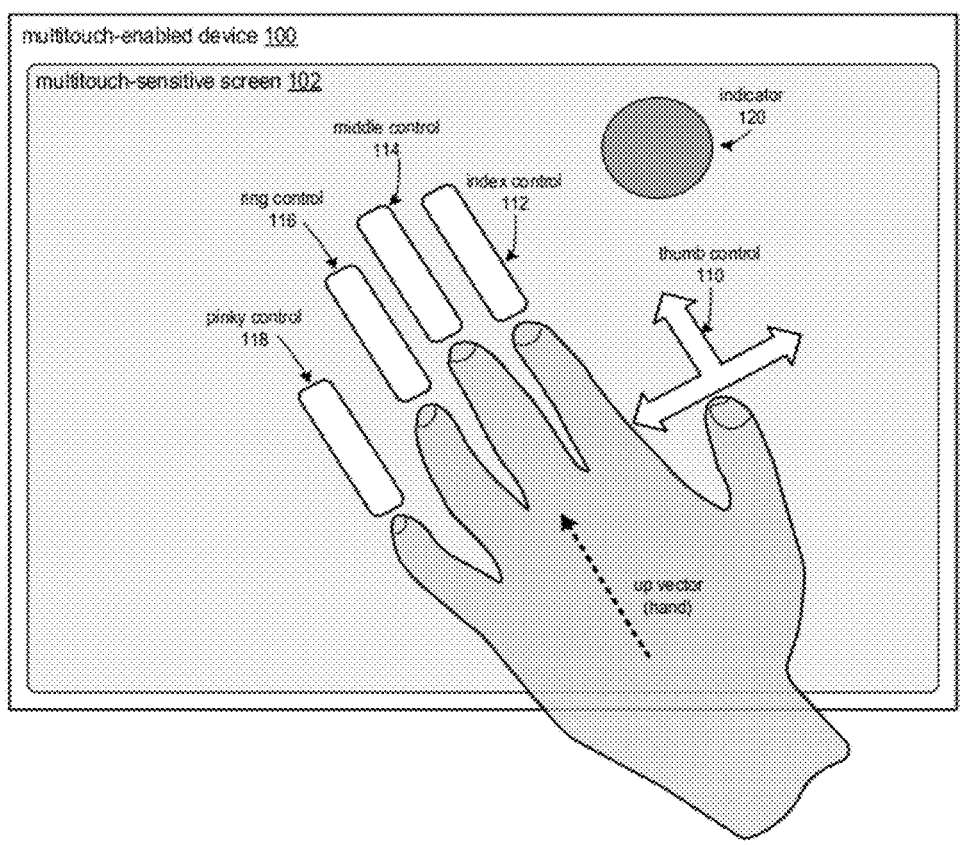
FIG. 7 illustrates an example in which all of the controls associated with the digits are oriented according to the up vector for the hand, according to at least some embodiments

In the examples shown in FIGS. 4A through 4C, each control or avatar is oriented according to the local coordinate frame or up vector of the respective index. In at least some embodiments, instead of orienting the controls or avatars according to the up vectors of the respective indexes, the controls may all be oriented according to the same up vector, for example according to the overall local coordinate frame for the hand. As previously described, the overall local coordinate frame may be compactly represented as a two-dimensional up vector for the hand. FIG. 7 and FIGS. 8A through 8D illustrates an example in which all of the controls (thumb control 110, index control 112, middle control 114, ring control 116, and pinky control 118) are oriented according to the up vector for the hand, as shown in FIG. 7. In at least some embodiments, to compute this up vector, a technique may be used that takes the average of the up vectors for the index and middle fingers as the up vector for the hand. In some embodiments, the local coordinate frame user interface may provide a user-selectable option via which the user may specify which of these orientation modes the user wants to employ.

Persistent and Ephemeral Modes

In some embodiments, the local coordinate frame user interface may provide one or both of a persistent mode and an ephemeral mode. In ephemeral mode, when the user lifts all five digits from the multitouch-sensitive screen 102, the displayed user interface elements may fade out after just a few seconds or may just immediately disappear; at least one control or avatar is only visible so long as the user has at least one digit in contact with the multitouch-sensitive screen 102. In persistent mode, when the user lifts all five digits from the multitouch-sensitive screen 102, the displayed user interface elements may persist for at least a while (several seconds), and the user interface may then allow the user to select and manipulate one of the displayed controls. Operation of the local coordinate frame user interface in ephemeral mode is represented in FIGS. 4A through 4C and FIGS. 5A through 5C. FIG. 7 and FIGS. 8A through 8D illustrate operation of the local coordinate frame user interface in persistent mode.

In FIG. 7, the user has applied a five-digit touch gesture to the multitouch-sensitive screen 102 with the left hand. A control is displayed corresponding to each index (thumb control 110, index control 112, middle control 114, ring control 116, and pinky control 118). In this example, the controls are all oriented according to a common up vector, but ephemeral mode may work with other orientation modes as well. In addition, an indicator 120 is shown that is displayed in a region of the multitouch-sensitive screen 102 that has been determined to be not likely occluded by the user's hand.

Figure 8A:
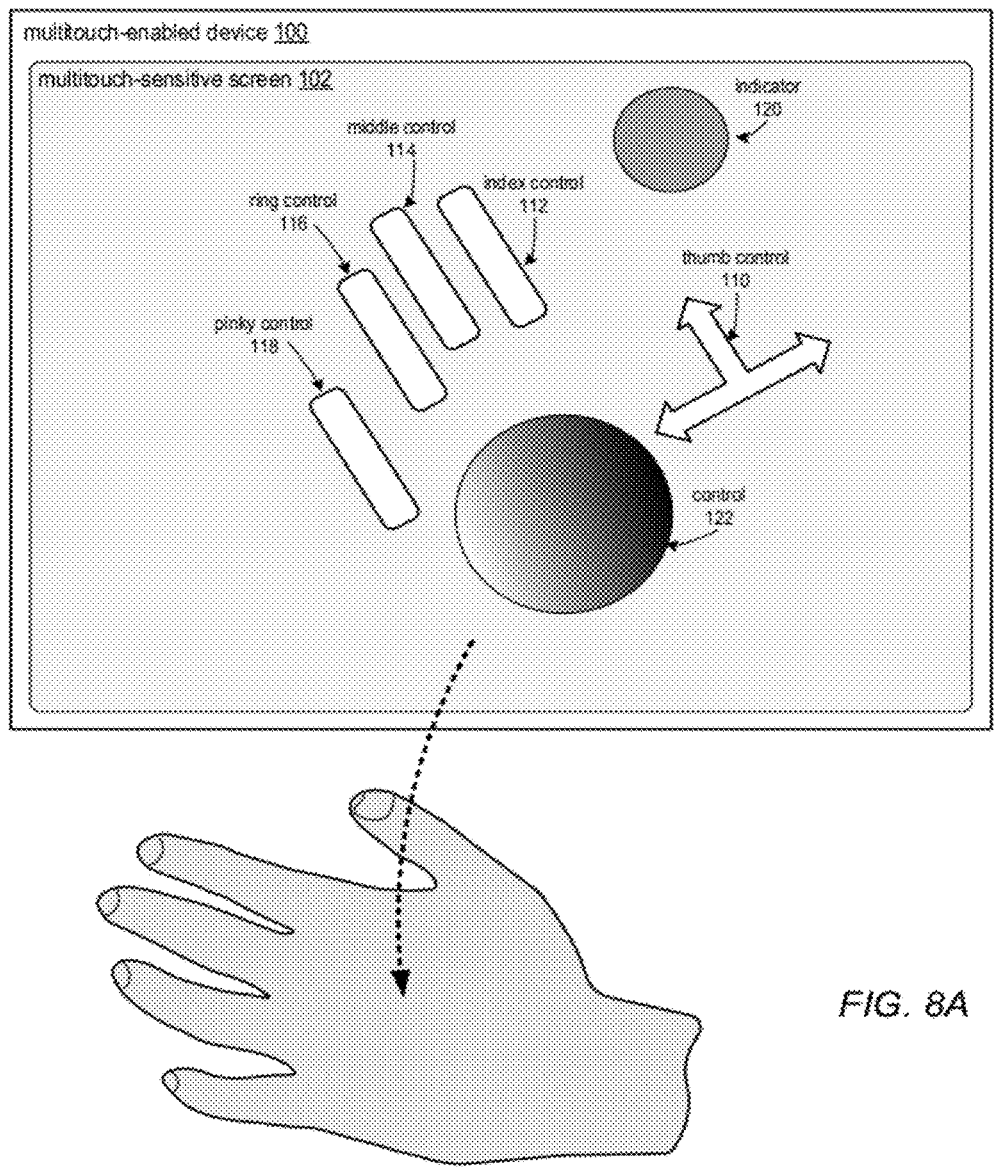
FIG. 8A illustrates that the user has removed all five digits from the display illustrated in FIG. 7 to invoke a persistent mode of the local coordinate frame user interface, according to at least some embodiments.

In FIG. 8A, the user has removed all five digits from contact with the multitouch-sensitive screen 102. Note that, in this example, another control 122 is displayed in a region that was previously at least partially occluded by the user's hand. This control 122 may have been previously displayed, or alternatively may only be displayed in response to the user removing at least some digits from the multitouch-sensitive screen 102. As another alternative, control 122 may only be displayed when the user selects one of the controls associated with a particular digit, for example a color control associated with the index finger.

Figure 8B:
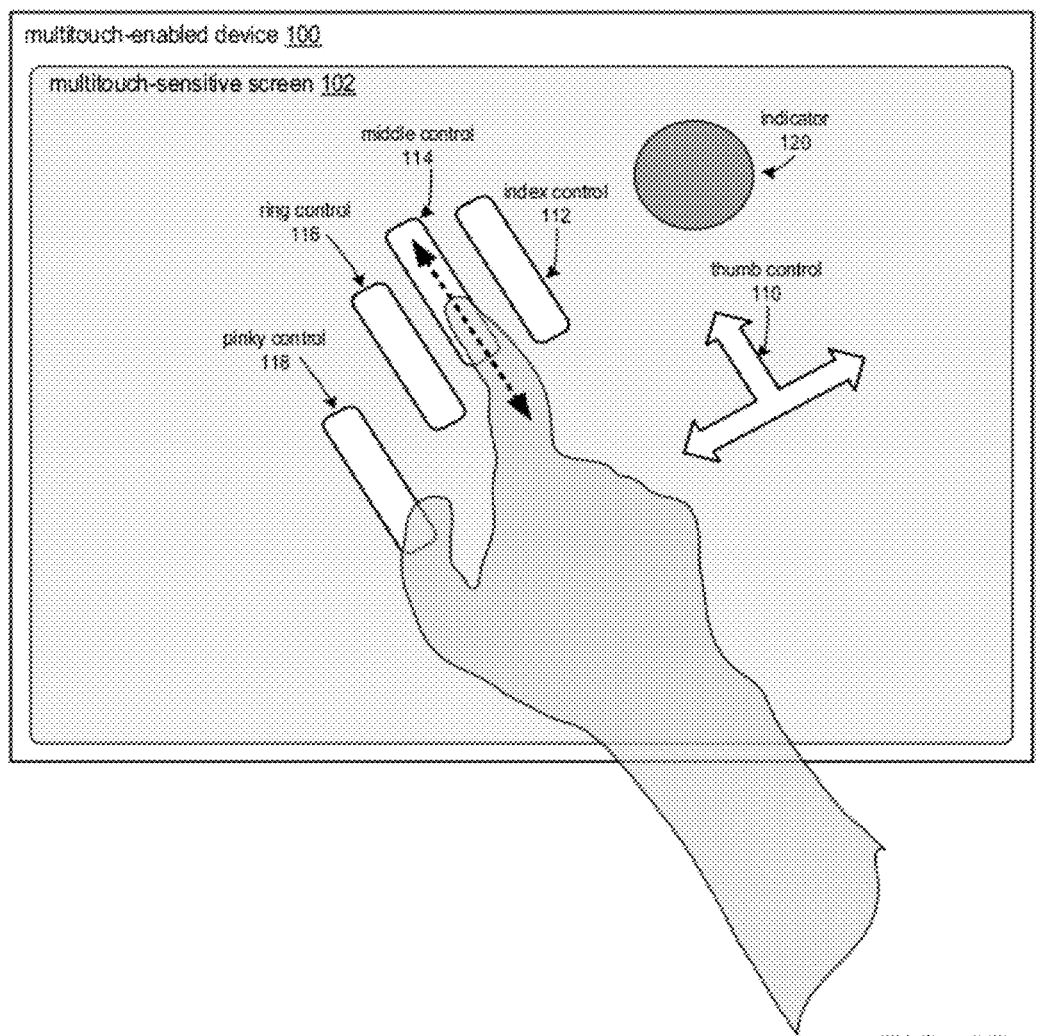
FIG. 8B illustrates that the user has selected and is manipulating a particular control of the local coordinate frame user interface associated with a particular digit, according to at least some embodiments.
Figure 8C:
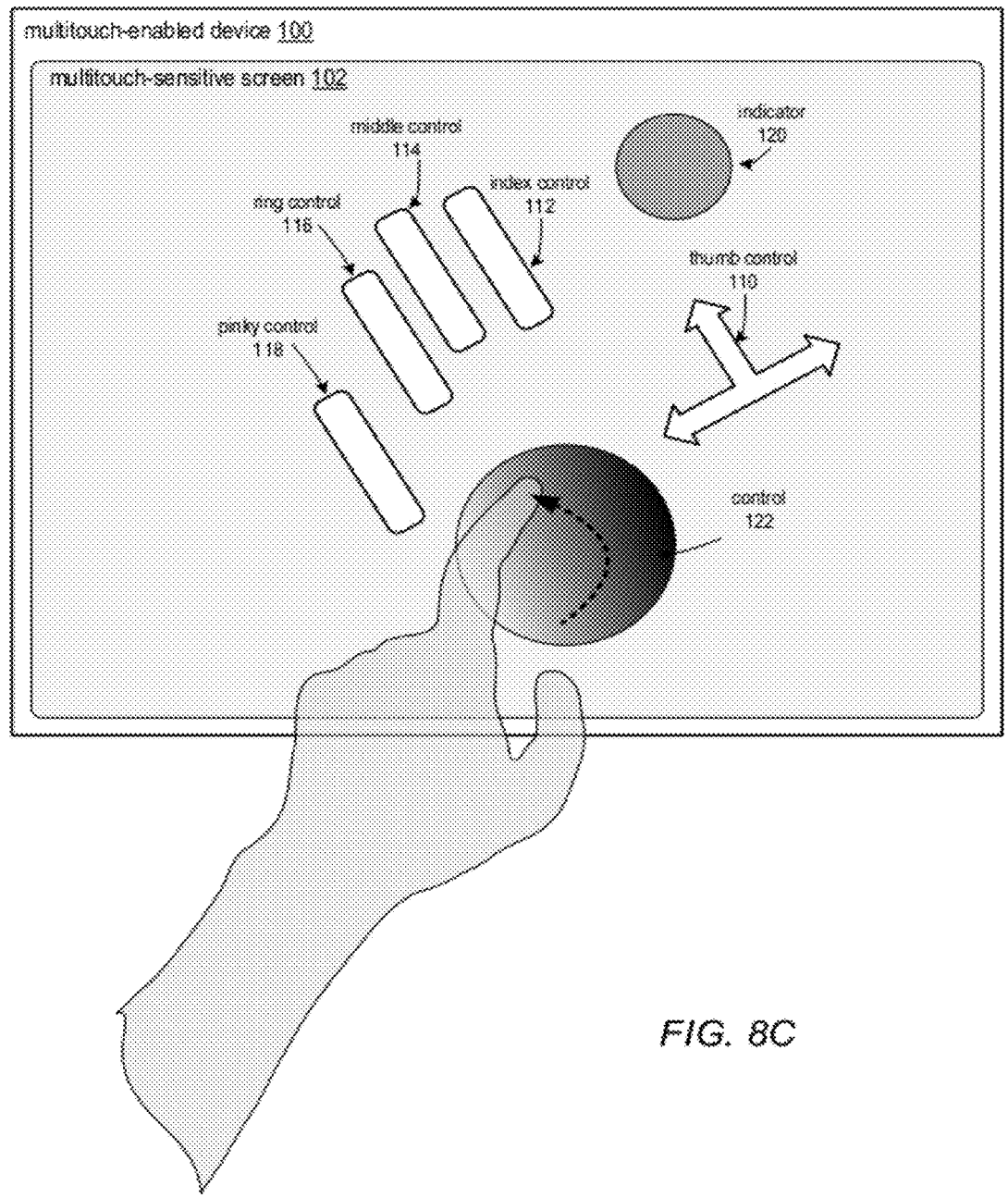
FIG. 8C illustrates that the user has selected and is manipulating another control of the local coordinate frame user interface, according to at least some embodiments.

In FIG. 8B, the user has used a digit (in this example, the index finger of the right hand) to select middle control 114. Selecting a control or avatar may activate the control or avatar. The user may then perform one or more gestures associated with the selected control to initiate an action or adjustment associated with the selected control. An indicator 120 may be updated to provide feedback for the control.

In FIG. 8C, the user is using a digit (in this example, the index finger of the left hand) to manipulate control 122. For example, control 122 may be a color wheel, and the user may move the digit on the color wheel to select a particular color. While not shown, one or more color chip user interface elements may also be displayed, and the user may perform a gesture (e.g., a tap) to assign a color selected on the color wheel to a particular color chip user interface elements.

Figure 8D:
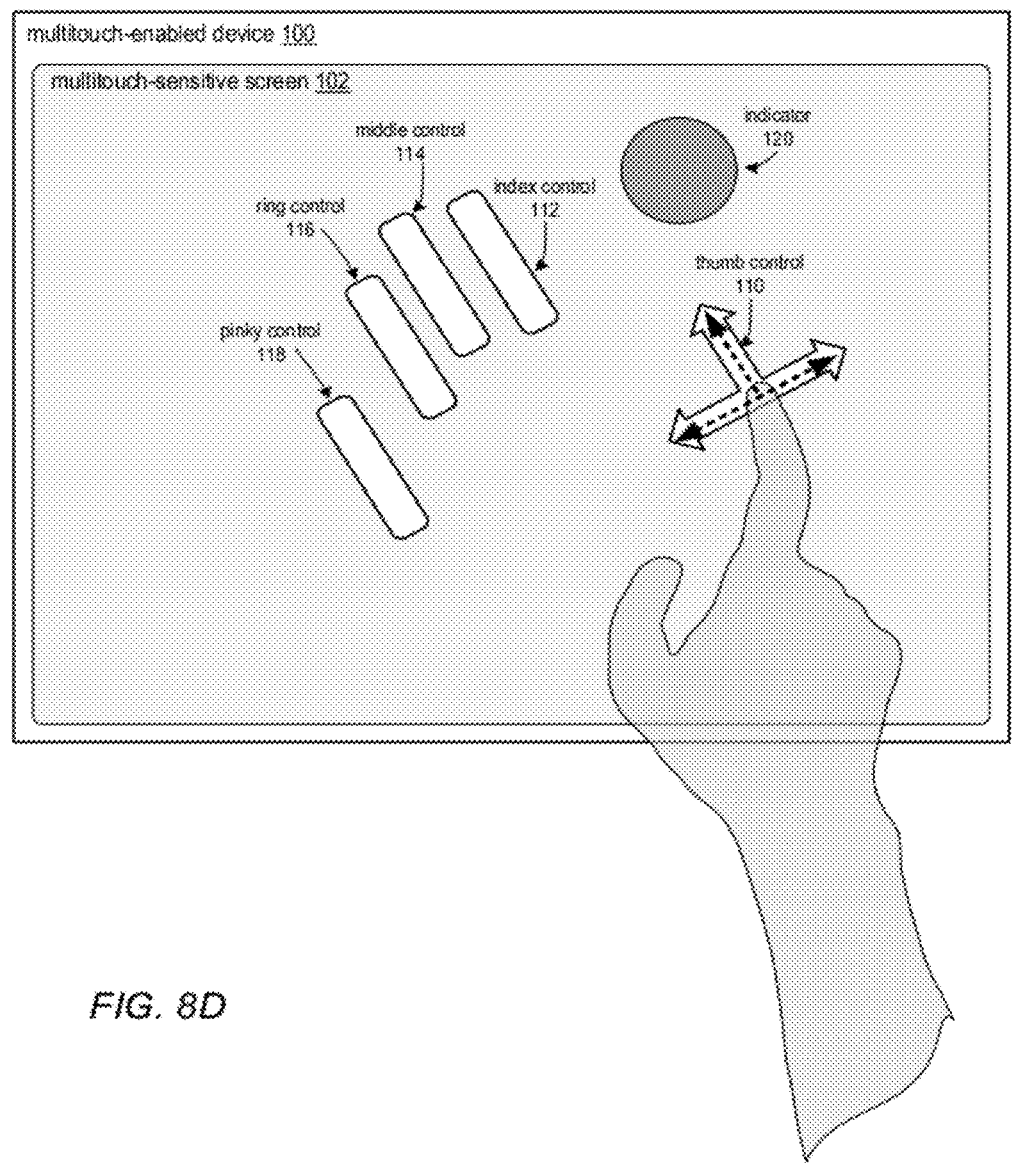
FIG. 8D illustrates that the user has selected and is manipulating a thumb control of the local coordinate frame user interface, according to at least some embodiments.

In FIG. 8D, the user is using a digit (in this example, the index finger of the right hand) to manipulate thumb control 110. Note that control 122 is not displayed. In this example thumb control 110, swipes with the digits in particular directions respective of a vector from the thumb touch point to the palm may invoke different actions, for example undo, redo, and erase all actions as previously described.

In FIGS. 8B through 8D, any digit on either hand (or combination of digits for gestures which require more than one digit) may be used to select and manipulate the controls; the user is not required to manipulate the controls with the same hand used to activate the local coordinate frame user interface when in persistent mode. While not shown in these Figures, one or more of the other controls or avatars of the local coordinate frame user interface may be hidden, changed, or moved when a particular control is selected and activated. In addition, one or more other controls or avatars may be displayed and activated when a particular control is selected. An example is a color wheel or other color selection control, which may be displayed when the user selects a color control avatar associated with a particular digit.

Application of Controls to Tools or Objects

Various ones of the controls in the above examples may be applied to objects displayed on the multitouch-sensitive screen 102 by the application that implements the local coordinate frame user interface and/or to tools of the application that implements the local coordinate frame user interface. For example, controls may be provided to adjust the opacity, color, or some other characteristic of an artistic object that the user has previously drawn to the screen 102. As another example, controls may be provided to adjust the opacity, color, size, or some other characteristic of a tool (e.g., a brush) that may be used to draw objects on the screen 102. As yet another example, controls may be provided to undo previous input operations to the screen using a tool, to redo undone operations, and/or to erase or clear the screen 102.

Other Examples of Controls

Various other types of controls or user interface elements than the provided examples may be associated with particular digits. For example, a "settings" control may be associated with a digit, for example the pinky, whereby the user can invoke a display of various settings for the application that implements the local coordinate frame user interface; the user may then use gestures or other input methods to adjust one or more of the settings for the application as necessary or desired.

Using the Local Coordinate Frame User Interface in Conjunction with Other Application Tools In at least some embodiments, the local coordinate frame user interface may be used in conjunction with other tools provided by an application that implements the interface. For example, in a painting, digital photograph editing, 3D modeling, or other graphical input and editing application, the user may draw or modify graphical objects, paint or perform other graphical input and editing operations using strokes applied with a brush or other tool, and perform other input and editing operations on the multitouch-sensitive screen 102 using a stylus, which may be a pen or one of the user's digits, or may perform other touch or multitouch operations of the application. Alternatively, the user may perform operations of the application using a cursor manipulated with a cursor control device, such as a mouse. While performing these various operations with one hand to create or edit graphical artwork, the user may invoke and manipulate the local coordinate frame user interface with the other hand.

Figure 9:
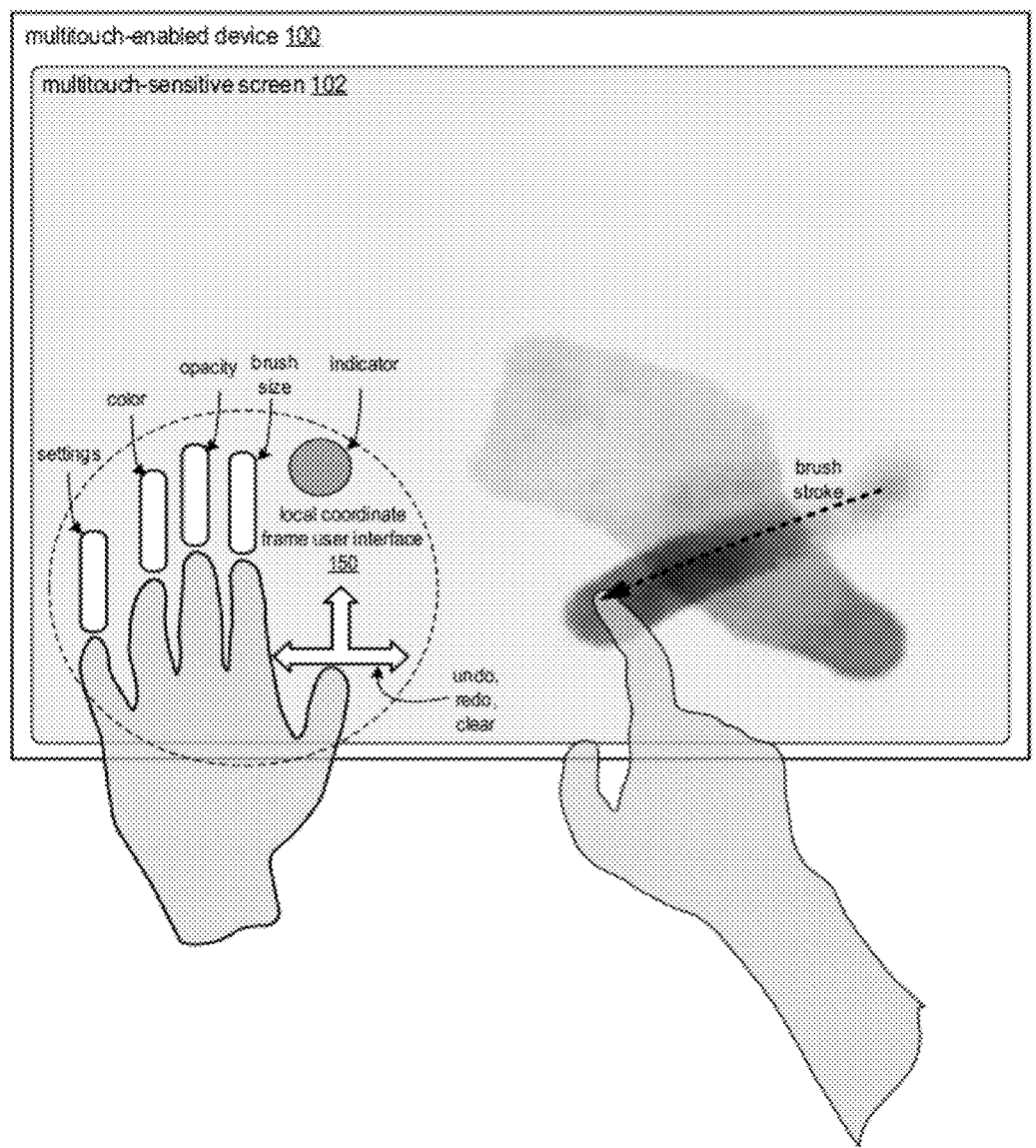
FIG. 9 illustrates using the local coordinate frame user interface with other user interface tools, such as painting tools, according to at least some embodiments.

As shown in FIG. 9, the local coordinate frame user interface 150 may be invoked and manipulated as described with one hand, while the user is performing other operations, for example applying painting strokes to the screen 102 using a selected brush tool, with the other hand. FIG. 9 shows the user invoking the local coordinate frame user interface 150 with the left hand, while painting with the right hand. In this example, the user may adjust brush size, opacity, or color, may perform undo, redo, or clear operations, or may change settings with one hand via the interface 150 before, during or after application of a brush stroke with the other hand. Using this combined graphical input and editing method, a user may quickly adjust various attributes (color, size, opacity, and so on) of selected tools and/or drawn objects, switch drawing tools or modes, and perform various other adjustments and actions via the local coordinate frame user interface 150 with one hand while performing other actions (e.g., drawing or painting) with the other hand. In addition, the user may quickly undo or redo previous operations, or may perform other adjustments or actions, using the local coordinate frame user interface 150, for example using a thumb control that allows the user to swipe in different directions relative to a directional vector to perform various actions as illustrated in FIG. 6.

Other Method for Invoking the Local Coordinate Frame User Interface

Some users may have difficulty in making the five-digit touch gesture to invoke the local coordinate frame user interface, or may not be able to make the gesture at all. For example, a user with missing digits or that lacks dexterity in their hands may have difficulty in making the gesture, or may not be able to make the gesture at all. Therefore, in at least some embodiments, one or more methods may be provided to invoke the local coordinate frame user interface that displays multiple user interface elements, each associated with a particular digit, for example as shown in FIG. 4A and FIG. 8A. The local coordinate frame user interface, so invoked, may be displayed in persistent mode, as described above. For example, in at least some embodiments, a gesture other than the five-digit touch gesture may be used to invoke the user interface in persistent mode. An example gesture that may be used may depend on the orientation of the device. Assuming that the user is right handed, and holding the device with the left hand, a swipe gesture from the top right of the screen into the middle of the screen with the right hand may invoke the persistent user interface in right hand mode. In the opposite case, a swipe gesture from the top left into the middle may invoke the persistent user interface in left hand mode. However, note that other gestures or other techniques may be used to invoke the persistent user interface. As an example of another gesture that may be used to invoke the persistent user interface, for devices equipped with an accelerometer, the user may shake the device to invoke the interface.

Example Implementations

Some embodiments may include a means for displaying and manipulating a local coordinate frame user interface that displays multiple user interface elements, each associated with a particular digit. For example, a local coordinate frame user interface module may receive multitouch input indicating a five-digit touch gesture, and may construct local coordinate frames and display multiple user interface elements each associated with a particular digit according to the local coordinate frames, as described herein. The local coordinate frame user interface module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving multitouch input indicating a five-digit touch gesture, constructing local coordinate frames and displaying multiple user interface elements each associated with a particular digit according to the local coordinate frames, as described herein. Other embodiments of the module may be at least partially implemented by hardware circuitry and/or firmware stored, for example, in a non-volatile memory.

FIG. 10 illustrates a local coordinate frame user interface (UI) module that implements a local coordinate frame user interface technique as described in FIGS. 1 through 9, implemented in an example artistic application. FIG. 12 illustrates an example computer system on which embodiments of an application 900 including a local coordinate frame UI module 920 may be implemented. Application 900 may be a multitouch gesture-based application, for example a painting or image editing application in which a user applies paint to a working canvas 902 via one or more tools, for example brush tools, through multitouch interface 904 and one or more other modules 906 that implement painting and other application operations. Working canvas 902 may be received as an input image 910, or may be generated within application 900. Module 910 receives as initial input 912 via interface 904 a five-digit touch gesture, or some other gesture, that invokes the UI. Module 920 determines local coordinate frames, displays UI avatars 922 corresponding to one or more of the digits, adjusts the displayed UI in response to movement of the hand, and so on. Module 920 may receive user input 912 via interface 904 selecting or activating one of the avatars, for example the lifting of all but one of the digits in ephemeral mode, or the lifting of all five digits and selection of one of the avatars in persistent mode. Module 920 then initiates adjustments or actions according to user input 912 received via interface 904 manipulating the activated avatar. The user may activate a different avatar to perform some other action or adjustment. The user may perform other application actions, e.g. painting actions, via the multitouch interface 904 and other modules 906, with the adjustments and actions performed via the avatars 922 applied to at least some of the other application actions, for example to adjust the color, size, or opacity of tools or objects, or to do other operations such as undo and redo operations. Application 900 generates as output one or more output images 930. Output image(s) 930 may, for example, be stored to a storage medium 940, such as system memory, a disk drive, DVD, CD, etc, and/or may be displayed to the display 950 of the device on which the application 900 is executing.

Figure 11:
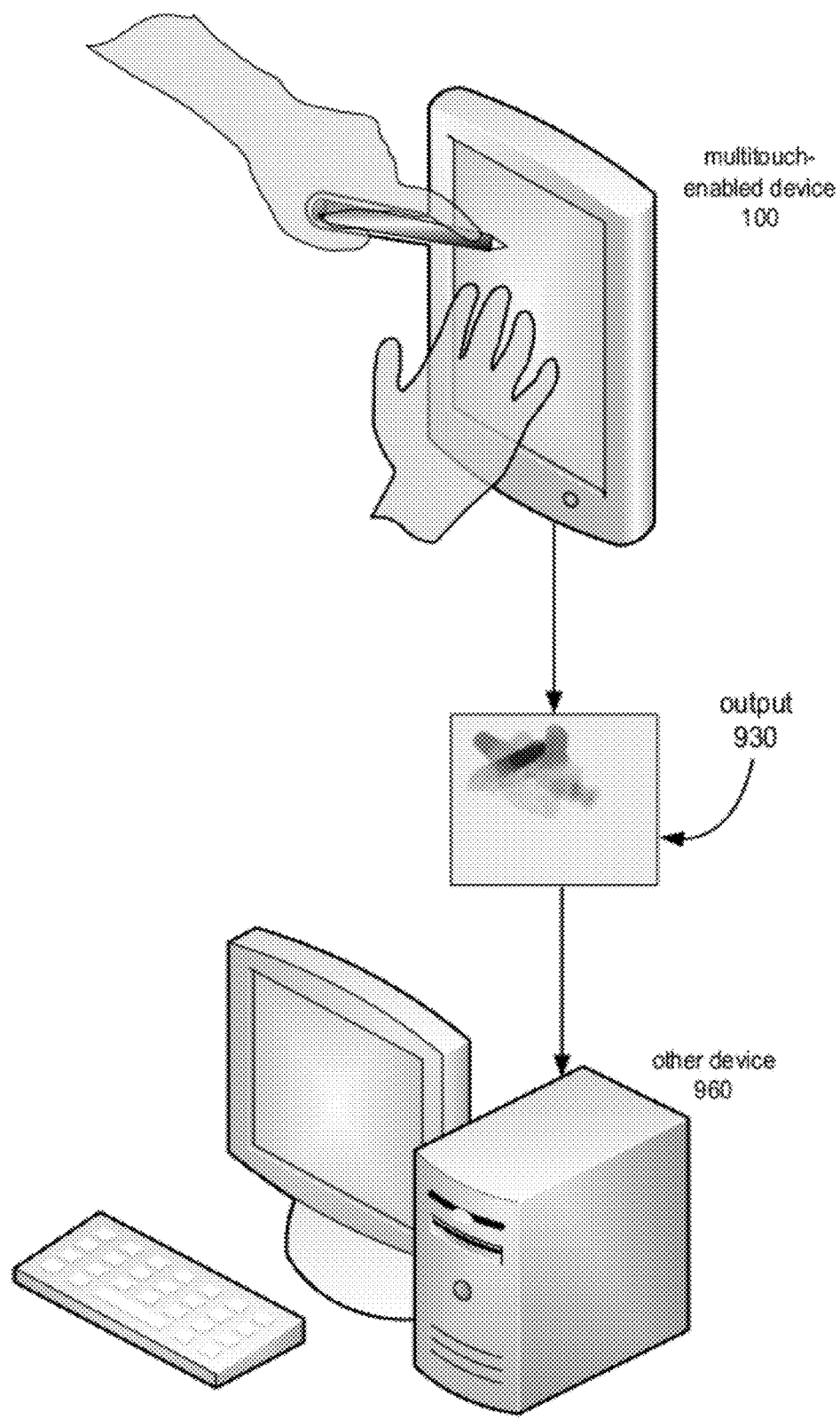
FIG. 11 illustrates creating output on a portable multitouch-enabled device that implements an application as shown in FIG. 10, and sending the output to another, more powerful device 960 for additional processing, according to at least some embodiments.

As shown in FIG. 10, in some implementations, output 930 may be sent to some other device 960 for further processing. FIG. 11 illustrates creating output 930 on a portable multitouch-enabled device 100 that implements application 900 as shown in FIG. 10, and sending the output 930 to another, more powerful device 960 for additional processing. For example, application 900 as shown in FIG. 10 may be an application that is specific to portable, relatively small multitouch-enabled devices such as an Apple® iPad® or similar devices. These devices may have relatively limited resolution and other resources for creating and editing graphic images. Therefore, the application 900 may create and edit artwork in a relatively lower-resolution format, generate output 930 in a format that may be read by another application on another device 960 with less limited resources including resolution capabilities, and pass the output 930 to the other application on the other device 960. The other application may then generate a higher-resolution image from the input received from application 900.

Example System

Embodiments of a local coordinate frame user interface (UI) module and/or of an application that implements the local coordinate frame UI module or techniques as described herein may be executed on one or more computer systems, which may interact with various other devices. One such computer system is illustrated by FIG. 12. In different embodiments, computer system 1000 may be any of various types of devices, including, but not limited to, a portable multitouch-enabled device, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 may further includes a wired and/or wireless network interface 1040 coupled to I/O interface 1030, and may include one or more input/output devices 1050, such as cursor control device 1060, keyboard 1070, display(s) 1080, and a multitouch interface 1090 such as a multitouch-enabled screen. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods and techniques disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of a local coordinate frame UI module and/or of an application that implements the local coordinate frame UI module or techniques are shown stored within system memory 1020 as program instructions 1025 and data storage 1035, respectively.

In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 12, memory 1020 may include program instructions 1025, configured to implement embodiments of a local coordinate frame UI module and/or of an application that implements the local coordinate frame UI module or techniques as described herein, and data storage 1035, comprising various data accessible by program instructions 1025. In one embodiment, program instructions 1025 may include software elements of embodiments of a local coordinate frame UI module and/or of an application that implements the local coordinate frame UI module or techniques as illustrated in the above Figures. Data storage 1035 may include data that may be used in embodiments. In other embodiments, other or different software elements and data may be included.

Those skilled in the art will appreciate that computer system 1000 is merely illustrative and is not intended to limit the scope of a local coordinate frame UI module and/or of an application that implements the local coordinate frame UI module or techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
receiving, on a multitouch-screen of a device, a multitouch gesture input indicating contact of multiple digits of a human hand;
constructing a local coordinate frame for the hand responsive to said receiving the multitouch gesture input of the multiple digits;
determining contact locations of the multiple digits on the multitouch-screen;
displaying, on the multitouch-screen of the device, two or more user interface elements that each correspond to a particular digit, the two or more user interface elements being displayed according to the determined contact locations of corresponding two or more digits relative to the local coordinate frame for the hand; and
detecting an event selecting a particular one of the two or more user interface elements, the event including all of the digits lifting off of the multitouch-screen except for a digit that corresponds to a selected one of the user interface elements.

2. The method as recited in claim 1, wherein said determining the contact locations of the multiple digits on the multitouch-screen comprises determining the contact location of a digit relative to the determined contact location of one or more of the other multiple digits.

3. The method as recited in claim 1, further comprising:
receiving, on the multitouch-screen of the device, a gesture input manipulating the selected user interface element to perform an action or apply an adjustment corresponding to the selected user interface element.

4. The method as recited in claim 3, wherein the event selecting the user interface element comprises the digit in contact with the multitouch-screen proximate the selected user interface element.

5. The method as recited in claim 1, wherein the user interface elements are displayed according to the local coordinate frame for the hand so that the user interface elements are not occluded by the hand performing the multitouch gesture input.

6. The method as recited in claim 1, wherein each of the two or more user interface elements is a control for adjusting a particular parameter of an application implemented on the device or a control for performing an action of the application.

7. The method as recited in claim 1, wherein each of the displayed two or more user interface elements are oriented according to an up vector of the hand, wherein the up vector is determined from the local coordinate frame for the hand.

8. The method as recited in claim 1, wherein each of the displayed two or more user interface elements are oriented according to an up vector of the particular digit corresponding to the user interface element, wherein the up vector for each digit is determined from the local coordinate frame for the hand.

9. The method as recited in claim 1, further comprising:
receiving, on the multitouch-screen of the device, input indicating movement of the multiple digits; and
adjusting the displayed two or more user interface elements according to the indicated movement.

10. The method as recited in claim 1, wherein the hand is either the left hand or the right hand, and wherein the local coordinate frame is oriented according to which hand is used so that the user interface elements are appropriately displayed according to the left hand or the right hand.

11. The method as recited in claim 1, further comprising:
determining a region of the multitouch-screen of the device that is not occluded by the hand according to the local coordinate frame; and
displaying, on the multitouch-screen of the device, one or more other user interface elements, wherein at least one of the one or more other user interface elements is displayed in the non-occluded region.

12. A multitouch-enabled device, comprising:
a multitouch-screen configured to display a local coordinate frame user interface;
at least one processor to implement a local coordinate frame user interface module as executable instructions, the local coordinate frame user interface module configured to:
receive, on the multitouch-screen, a multitouch gesture input indicating contact of multiple digits of a human hand;
construct a local coordinate frame for the hand responsive to the multitouch gesture input of the multiple digits;
determine contact locations of the multiple digits on the multitouch-screen;
display, on the multitouch-screen, two or more user interface elements that each correspond to a particular digit, the two or more user interface elements displayable according to the determined contact locations of corresponding two or more digits relative to the local coordinate frame for the hand; and
detect an event selecting a particular one of the two or more user interface elements, the event including all of the digits lifting off of the multitouch-screen followed by contact of a digit on the multi-touch screen proximate a selected one of the user interface elements.

13. The multitouch-enabled device as recited in claim 12, wherein the local coordinate frame user interface module is configured to:
receive, on the multitouch-screen, a gesture input manipulating the selected user interface element to perform an action or apply an adjustment corresponding to the selected user interface element.

14. The multitouch-enabled device as recited in claim 12, wherein the user interface elements are displayed according to the local coordinate frame for the hand so that the user interface elements are not occluded by the hand performing the multitouch gesture input.

15. The multitouch-enabled device as recited in claim 12, wherein each of the two or more user interface elements is a control for adjusting a particular parameter of an application implemented on the multitouch-enabled device or a control for performing an action of the application.

16. The multitouch-enabled device as recited in claim 12, wherein the hand is either the left hand or the right hand, and wherein the local coordinate frame is oriented according to which hand is used so that the user interface elements are appropriately displayed according to the left hand or the right hand.

17. One or more computer-readable storage memory devices comprising stored program instructions that are computer-executable to implement:
receiving, on a multitouch-screen of a device, a multitouch gesture input indicating contact of multiple digits of a human hand;
constructing a local coordinate frame for the hand responsive to said receiving the multitouch gesture input of the multiple digits;
determining contact locations of the multiple digits on the multitouch-screen;
displaying, on the multitouch-screen of the device, two or more user interface elements that each correspond to a particular digit, the two or more user interface elements being displayed according to the determined contact locations of corresponding two or more digits relative to the local coordinate frame for the hand; and
detecting an event selecting a particular one of the two or more user interface elements, the event including all of the digits lifting off of the multitouch-screen except for a digit that corresponds to a selected one of the user interface elements.

18. The one or more computer-readable storage memory devices as recited in claim 17, the program instructions further computer-executable to implement:
receiving, on the multitouch-screen of the device, a gesture input manipulating the selected user interface element to perform an action or apply an adjustment corresponding to the selected user interface element.

19. The one or more computer-readable storage memory devices as recited in claim 17, wherein the user interface elements are displayed according to the local coordinate frame for the hand so that the user interface elements are not occluded by the hand performing the multitouch gesture input.

20. The one or more computer-readable storage memory devices as recited in claim 17, wherein each of the two or more user interface elements is a control for adjusting a particular parameter of an application implemented on the device or a control for performing an action of the application.

21. The one or more computer-readable storage memory devices as recited in claim 17, wherein the hand is either the left hand or the right hand, and wherein the local coordinate frame is oriented according to which hand is used so that the user interface elements are appropriately displayed according to the left hand or the right hand.

* * * * *